US010791333B2

(12) United States Patent
Van Leuven et al.

(10) Patent No.: US 10,791,333 B2
(45) Date of Patent: Sep. 29, 2020

(54) VIDEO ENCODING USING HIERARCHICAL ALGORITHMS

(71) Applicant: Magic Pony Technology Limited, London (GB)

(72) Inventors: Sebastiaan Van Leuven, London (GB); Zehan Wang, London (GB); Robert David Bishop, London (GB)

(73) Assignee: Magic Pony Technology Limited, London (GB)

( * ) Notice: Subject to any disclaimer, the term of this patent is extended or adjusted under 35 U.S.C. 154(b) by 187 days.

(21) Appl. No.: 15/855,450

(22) Filed: Dec. 27, 2017

(65) Prior Publication Data

US 2018/0124414 A1 May 3, 2018

Related U.S. Application Data

(63) Continuation of application No. PCT/GB2017/051251, filed on May 5, 2017.

(30) Foreign Application Priority Data

May 5, 2016 (GB) .................................. 1607879.2

(51) Int. Cl.
*H04N 19/87* (2014.01)
*H04N 19/196* (2014.01)
(Continued)

(52) U.S. Cl.
CPC ......... *H04N 19/187* (2014.11); *H04N 19/103* (2014.11); *H04N 19/124* (2014.11);
(Continued)

(58) Field of Classification Search
CPC .. H04N 19/103; H04N 19/124; H04N 19/149; H04N 19/174; H04N 19/176;
(Continued)

(56) References Cited

U.S. PATENT DOCUMENTS 6,075,884 A 6/2000 Lubin et al.
8,553,769 B2 * 10/2013 He .......................... H04N 19/33
375/240.12
(Continued)

FOREIGN PATENT DOCUMENTS

WO 2017/191461 A1 11/2017

OTHER PUBLICATIONS

Search Report for Application No. GB1607879.2, dated Nov. 8, 2016, 3 pages.
(Continued)

*Primary Examiner* — Jamie J Atala
*Assistant Examiner* — Joon Kwon
(74) *Attorney, Agent, or Firm* — Brake Hughes Bellermann LLP

(57) ABSTRACT

The present disclosure relates to encoding visual data comprising a plurality of layers using one or more hierarchical algorithms. According to an aspect, there is provided a method of encoding visual data using a plurality of layers wherein each layer encodes a different representation, and wherein one or more of the plurality of layers comprises one or more hierarchical algorithms, the method comprising the steps of: extracting one or more samples within each of the plurality of layers; and processing within each layer the one or more samples extracted in the layer; wherein in at least one of the plurality of layers the step of processing comprises applying the one or more hierarchical algorithms to the samples extracted in the layer in relation to any interlayer prediction; and wherein the step of processing reduces a predetermined mathematical distortion between samples of a first layer and samples of a second layer.

20 Claims, 21 Drawing Sheets

(51) Int. Cl.
*H04N 19/30* (2014.01)
*H04N 19/149* (2014.01)
*H04N 19/124* (2014.01)
*H04N 19/187* (2014.01)
*H04N 19/33* (2014.01)
*H04N 19/174* (2014.01)
*H04N 19/31* (2014.01)
*H04N 19/176* (2014.01)
*H04N 19/103* (2014.01)

(52) U.S. Cl.
CPC ......... *H04N 19/149* (2014.11); *H04N 19/174* (2014.11); *H04N 19/176* (2014.11); *H04N 19/196* (2014.11); *H04N 19/30* (2014.11); *H04N 19/31* (2014.11); *H04N 19/33* (2014.11)

(58) Field of Classification Search
CPC .... H04N 19/187; H04N 19/196; H04N 19/30; H04N 19/31; H04N 19/33
See application file for complete search history.

(56) References Cited

U.S. PATENT DOCUMENTS

| | | | |
|---|---|---|---|
| 2008/0095235 A1* | 4/2008 | Hsiang | H04N 19/63 375/240.13 |
| 2012/0033040 A1* | 2/2012 | Pahalawatta | H04N 19/597 348/43 |
| 2013/0230095 A1* | 9/2013 | Mathew | H04N 19/66 375/240.02 |
| 2014/0192865 A1* | 7/2014 | Zhang | H04N 19/503 375/240.12 |
| 2014/0286409 A1* | 9/2014 | Zhang | H04N 19/105 375/240.12 |
| 2014/0341273 A1* | 11/2014 | Ye | H04N 19/36 375/240.02 |
| 2015/0208092 A1* | 7/2015 | Lee | H04N 19/105 375/240.12 |
| 2019/0014320 A1* | 1/2019 | Navarrete Michelini | H04N 19/63 |

OTHER PUBLICATIONS

International Search Report and Written Opinion for International Application No. PCT/GB2017/051251, dated Aug. 8, 2017, 14 pages.

Chao, et al., "Learning a Deep Convolutional Network for Image Super-Resolution", ECCV 2014, Part IV, LNCS 8692, Sep. 6, 2014, pp. 184-199.

Shi, et al., "Spatially Scalable Video Coding for HEVC", IEEE Transactions on Circuits and Systems for Video Technology, Institute of Electrical and Electronics Engineers, vol. 22, No. 12, Dec. 1, 2012, pp. 1813-1826.

* cited by examiner

VIDEO ENCODING USING HIERARCHICAL ALGORITHMS

CROSS REFERENCE TO RELATED APPLICATIONS

This application is a continuation of, and claims priority to, International Patent Application No. PCT/GB2017/051251, filed on May 5, 2017, which claims priority to United Kingdom Application No. GB 1607879.2, filed on May 5, 2016, the contents of both of which are incorporated herein by reference.

TECHNICAL FIELD

This description relates to encoding visual data comprising a plurality of layers using one or more hierarchical algorithms.

BACKGROUND

Scalable video compression is an extension of regular video compression. In regular video compression, a bit stream represents a single quality of the content. Scalable video compression allows the encoding of different versions of the same content within a single bit stream, applying various mechanisms to reduce the bit rate compared to a simulcast scenario, where all representations are encoded independently.

In scalable video compression, each representation is encoded in a different layer. A layer can allow for temporal, spatial or quality scalability. Furthermore, temporal scalability can also be applied in single layer compression using efficient group of pictures ('GOP') structures.

Scalable video compression is applied differently for H.264/Scalable Video Coding ('SVC') and Scalable High Efficiency Video Coding ('SHVC'). In H.264/SVC, only one motion compensation loop is performed at the decoder with the aim of limiting complexity and memory bit rates of decoders. Consequently, the prediction between layers is performed in the residual domain for inter-block while intra-blocks are processed in the pixel domain. An example of such generic encoder can be found in FIG. 1. FIG. 1 shows a generic SVC encoder 100 with two layers, a base layer 110 and an enhancement layer 120. The SVC encoder 100 takes an input 130 and produces an SVC bit stream 140 wherein the inter-layer residual prediction 135 means the motion compensation loop for the base layer 110 is not required to decode the enhancement layer 120 picture.

Conversely, SHVC only allows predictions between layers based on the decoded picture of lower layers, where lower layers correspond to a lower fidelity representation. Furthermore, SHVC enables codec scalability, where a base layer can be encoded using H.264/AVC and the enhancement layers encoded using High Efficiency Video Coding ('HEVC'). When the spatial resolution between base and enhancement layers differs up-sampling may be used, which is different for H.264/SVC and HEVC. To optimize the syntax, the motion vector field is also up-scaled and can be used as a prediction for the enhancement layer. FIG. 2 shows a generic SHVC encoder with two spatial layers.

Quality scalability in H.264/SVC can be achieved in two ways, using Coarse Grain Scalability ('CGS') or Medium Grain Scalability ('MGS'). CGS requires each quality layer to correspond to a spatial layer of the same resolution as the lower layer but with a different quality, however this generates a large overhead due to syntax. MGS allows a signal for each block of the base layer to contain additional data. This additional data corresponds to the residual data of a lower quantisation minus the previously signalled residual of the base layer. This allows for a limited difference in quality between both layers.

HEVC only allows for CGS using different quantization for each spatial layer, hence the overhead in bit rate and processing is significant.

SUMMARY

Aspects and/or embodiments are set out in the appended claims. Some aspects and/or embodiments can improve the compression performance of input data using one or more hierarchical algorithms.

According to a first aspect, there is provided a method of encoding visual data using a plurality of layers wherein each layer encodes a different representation, and wherein one or more of the plurality of layers comprises one or more hierarchical algorithms, the method comprising the steps of: extracting one or more samples within each of the plurality of layers; and processing within each layer the one or more samples extracted in the layer; wherein in at least one of the plurality of layers the step of processing comprises applying the one or more hierarchical algorithms to the samples extracted in the layer in relation to any inter-layer prediction; and wherein the step of processing reduces a predetermined mathematical distortion between samples of a first layer and samples of a second layer.

Encoding visual data using a plurality of layers, each encoding a different representation using one or more hierarchical algorithms, can enable improved performance for inter-layer prediction and compression.

In some implementations, the plurality of layers may comprise one or more enhancement layers and one or more base layers. Furthermore, the step of applying the one or more hierarchical algorithms to the samples extracted in the layer in relation to any inter layer prediction may occur prior to or as part of any inter layer prediction.

In some implementations, the one or more samples are any of: blocks, macroblocks, prediction units, coding units, patches, segments, shapes, groups of pixels, slices, tiles, or single pixel values located at or between pixel positions. This can enable a more granular approach to the compression and the application of one or more hierarchical algorithms to be applied to a portion of the visual data as opposed to an entire frame or the entire visual data itself.

In some implementations, the method may further comprise a step of processing in at least one of the plurality of layers; wherein the step of processing in at least one of the plurality of layers comprises applying the one or more hierarchical algorithms to one or more inter-layer predictions. Alternatively, the one or more hierarchical algorithms may be applied to all inter-layer predictions. This can enable each layer to receive different inputs depending whether a hierarchical algorithm was applied to the respective inter-layer prediction, it also allows for customisation based upon differing hardware capabilities.

In some implementations, one of the one or more hierarchical algorithms may generate a higher resolution version of the one or more samples for inter-layer prediction based on a block basis, on a picture basis or on a sub-picture basis, which can enable the method to be used for upscaling input visual data. The sub-picture basis may comprise a group of blocks, slices or tiles.

In some implementations, the method may further comprise applying the one or more hierarchical algorithms to a plurality of different components, wherein the different components may be any of: a residual component, a visual data component, luma components, chroma components, transformed data, filter coefficients, syntax component, prediction modes, supplemental enhancement information component, or a motion data component. This can enable the one or more hierarchical algorithms to be applied to different residual components and thereby can increase the encoding performance by enabling a most beneficial hierarchical algorithm to be applied to each of the different components.

In some implementations, one of the plurality of different components may communicate with one or more of the plurality of different components to improve the process of the different components. The communication between the different components may be unilateral, or bilateral. Communication between the different components can enable information to be passed between said components so as to increase the compression performance.

In some implementations, the processing may occur on one or more blocks of pictures in one or more of the plurality of layers. This can allow the processing to occur selectively based upon the aims of the compression, the input data, and the hardware characteristics.

In some implementations, the one or more hierarchical algorithms may be different hierarchical algorithms. This can enable the most appropriate hierarchical algorithm to be selected based upon the goals of the method and implementation properties such as hardware characteristics and the input data.

In some implementations, the processing may occur on any one of, I-pictures, IRAP pictures, or intra-encoded pictures. In some implementations, the processing results in a prediction for an enhancement layer. Processing on any of the above may improve the inter-layer prediction for the related frames. This may significantly improve the bit rate of the total bitstream. Furthermore, if the temporal prediction is efficient the inter-layer predictions for the interpictures will not have any gain. This can ensure that the complexity can be reduced by only applying the hierarchical algorithm to the intra-predicted pictures.

In some implementations, the one or more samples may not be fully reconstructed in one of the one or more base layers. As such, a first hierarchical algorithm may comprise one or more layers of one or more further hierarchical algorithms, and wherein the one or more hierarchical algorithms may comprise both the first hierarchical algorithm and the one or more further hierarchical algorithms. Furthermore, a different hierarchical algorithm may be applied to each of the one or more blocks, and/or a different hierarchical algorithm may be applied to each of the plurality of layers and/or a different hierarchical algorithm may be applied between different enhancement layers where the same base layer is used. Applying different hierarchical algorithms can enable each hierarchical algorithm to have different goals and/or optimisations and, as such, be combined so as to provide the most optimal prediction.

In some implementations, the method may further comprise the step of applying a different hierarchical algorithm to the one or more samples from a plurality of the one or more base layers resulting in a plurality of enhancement layer predictions.

In some implementations, the step of processing the one or more samples may further comprise the step of applying a plurality of the one or more hierarchical algorithms on the samples and storing the resulting pictures for inter-layer prediction. This can enable the one or more hierarchical algorithms in lower layers to produce a most optimal encoding of a current layer.

In some implementations, the one or more samples may be pictures from different layers and wherein an output of the hierarchical algorithm is one or more predicted enhancement layer pictures. In some implementations, the one or more samples may be a low resolution high quality base layer and a low quality high resolution base layer. This can enable multiple pictures to be generated for any inter-layer prediction, providing larger amounts of data for optimising the encoding.

In some implementations, the one or more hierarchical algorithms may predict a motion vector of one or more higher layers, and/or a delta motion vector compared to the one or more base layers, and/or the partitioning of a group of pixels, wherein the partitioning is macroblock partitioning, CU-splitting, or superblock-subdivision. This can enable multiple pictures to be generated for any inter-layer prediction, providing larger amounts of data for optimising the encoding.

In some implementations, the one or more hierarchical algorithms may be applied to one or more output reference pictures, such as golden reference frames, wherein the one or more golden reference frames may be selected from one or more previously received frames and/or visual data.

In some implementations, the method may further comprise applying one or more hierarchical algorithms within a spatial layer when the resolution of the layer is changed adaptively. Furthermore, the method may comprise applying one or more hierarchical algorithms to one or more previously decoded and stored reference pictures, such that the distortion between the one or more previously decoded and stored reference pictures, and one or more current pictures may be reduced. This may be achieved by predicting the current pictures using the one or more previously decoded and stored reference pictures from one or more different layers. This can enable feedback to be incorporated into future layers to further optimise the encoding.

In some implementations, the method may further comprise applying the one or more hierarchical algorithms to predict one or more higher layers, wherein the higher layers are not temporally co-located. Further optionally the one or more higher layers may improve the visual quality of the scene representation. This can enable improvements to be made without additional reference pictures being created, and directly improving the decoded picture using one or more hierarchical algorithms.

In some implementations, the method may further comprise the step of applying the one or more hierarchical algorithms to one or more input samples from one or more temporal reference pictures from one of the plurality of layers and/or to one or more temporally co-located base layer pictures and/or one or more temporally non-collocated previously decoded base layer pictures. The method may also further comprise applying the one or more hierarchical algorithms to the one or more input samples from temporally co-located or non-co-located input samples from one or more lower layers, and/or wherein the one or more lower layers represent a lower quality representation of the scene. Furthermore, the one or more hierarchical algorithms may be applied to the input sample, and/or an output may be stored in a reference picture buffer. The same hierarchical algorithm may be used throughout and, regardless of whether the same hierarchical algorithm is used, the one or more hierarchical algorithms may be applied in parallel. This can enable the generated base layer prediction to contain information on the motion displacement and the enchantment layer picture to provide additional quality due to having a higher fidelity, thereby generating a temporally up-scaled picture.

In some implementations, the method may further comprise the step of applying the one or more hierarchical algorithms with one or more reconstructed pictures of the one or more base layers to generate a picture of the one or more enhancement layers. The reconstructed pictures may be temporally co-located or may not be temporally co-located. Furthermore, the one or more hierarchical algorithms may be applied to the reconstructed pictures. This can enable different pictures regardless of temporal location to be used to enhance the processing.

In some implementations, one or more of the layers may be scalable layers, wherein each scalable layer may represent a viewpoint of a 3D scene. Furthermore, a resolution for a first viewpoint may be different to a resolution for one or more further viewpoints, and one or more layers may comprise a plurality of viewpoints in a frame packed arrangement and the one or more enhancement layers comprise additional data to improve the resolution of the one or more viewpoints of the frame packed arrangement. An inter-view prediction may be applied between the different viewpoints of a 3D scene, and the one or more hierarchical algorithms may be applied to any of the plurality of different components of the one or more viewpoints to predict one or more components of the one or more further viewpoints. This can enable 3D scenes to be encoded in a substantially optimal way using the method previously described.

In some implementations, the one or more hierarchical algorithms may applied as a view synthesis process, wherein a result of the view synthesis process may be used for inter-view prediction, and/or wherein a result of the view synthesis process may used to create a multiview output. Similarly, an output of the one or more hierarchical algorithms may be used for view synthesis. This can enable the method to synthesise different views based upon the input data.

In some implementations, the method may further comprise applying the one or more hierarchical algorithms on a decoded output for one or multiple layers or viewpoints for view synthesis, and determining one or more intermediate views for displaying, which can enable more accurate display of the encoded information.

In some implementations, the method may further comprise receiving multiple components, which can enable the hierarchical algorithm to be applied over the multiple components and increase the performance of the encoding.

In some implementations, the method may further comprise applying the one or more hierarchical algorithms to generate one or more lower-resolution representations, this may enable more efficient transmission or reduction in file size of the encode information.

In some implementations, the one or more hierarchical algorithms may be any of: pre-trained, pre-defined, fine-tuned, self-updating, selected from a database of hierarchical algorithms, or trained using a learned approach, wherein the learned approach comprises machine learning techniques.

In some implementations, the one or more hierarchical algorithms are received and the one or more hierarchical algorithms may be stored in a memory. This can enable the hierarchical algorithms to be stored remotely, and provided to the method on an ad hoc basis.

In some implementations, the hierarchical algorithm may be any of one or more: convolutional neural networks, recurrent neural networks, random forests, long-short term memory, memory networks, gated recurrent network, or a dictionary learning based method or methods.

In some embodiments, the training of convolutional neural networks can be more computationally complex than dictionary learning for a similar accuracy, but the resulting model or algorithm can also be more flexible in representing visual data while using fewer coefficients for the reconstruction. In some embodiments, the resultant convolutional neural network model to be transmitted alongside the lower-quality visual data can be both smaller and can be more accurate in the reconstruction of the higher-quality visual data.

Some aspects can provide an improved technique for generating reconstruction parameters that can be used, when converting original high-quality visual data into a down-sampled low-quality visual data, to allow recreation of higher quality visual data without significant loss in quality, for example having a low reconstruction error in comparison with the original visual data, and with a reduction in visual data transferred over a network. In such aspects, the application of such a technique can reduce the data transmitted when transmitting visual data in comparison with existing techniques while enabling reproduction of the visual data at its original quality without significant loss in quality in comparison to the original visual data (where quality can be defined by objective metrics such as error rate, PSNR and SSIM as well as subjective measures) or, alternatively, based on a perception measure or metric rather than on a pixel-wise comparison of images. In such aspects, such a proposed technique can allow minimal changes to be made to the overall infrastructure of service providers, as it can augment most existing compression techniques, and can provide advantages in encoding and streaming applications.

In some implementations, the hierarchical algorithm may comprise a plurality of layers, wherein the layers may be any of sequential, recurrent, recursive, branching or merging.

Having a number of layers in some embodiments, which may or may not be sequential, recurrent, recursive, branching or merging allows different levels of processing to occur at different times and the layers can work in parallel, ensuring optimal efficiency when enhancing the resolution of the visual data.

In some implementations, encoding may comprise compression, enabling the method to be use for providing an optimal compression of the input visual data.

In some implementations, the visual data may comprise at least one of: an image, a sequence of images, a video, or a section of image or video data.

This can allow the method to enhance various types of visual data, including but not limited to, still images, video, and computer generated/rendered content.

Aspects and/or embodiments include a computer program product comprising software code to effect the method and/or apparatus of other aspects and/or embodiments herein described.

It should be noted that in some aspects and/or embodiments, the terms model and/or algorithm and/or representation and/or parameters and/or functions can be used interchangeably.

It should also be noted that visual data, in some embodiments, may comprise image and/or video data.

References to visual data can be references to video data and/or image data in some aspects and/or embodiments and vice versa. References to low-quality and/or lower-quality can be references to low-resolution and/or lower-resolution in some aspects and/or embodiments and vice versa. References to high-quality and/or higher-quality and/or highest quality and/or original quality can be references to high-resolution and/or higher-resolution and/or highest-resolution and/or original resolution and/or increased fidelity in some aspects and/or embodiments and vice versa. References to sections can be references to frames and/or portions of frames in some aspects and/or embodiments and vice versa. References to enhance or enhancement can be references to upscale and/or upscaling in some aspects and/or embodiments and vice versa.

BRIEF DESCRIPTION OF FIGURES

Embodiments will now be described, by way of example only and with reference to the accompanying drawings in which.

DETAILED DESCRIPTION

Various embodiments will now be described below in detail with reference to the Figures referenced above.

In some embodiments it is possible to substantially mitigate or overcome the problem of a large overhead in bit rate and processing by encoding different versions of the same content representation within a bit stream to be developed using a plurality of layers, and having each layer encode a different representation. In some embodiments, each layer may comprise one or more hierarchical algorithms, such that the hierarchical algorithms are applied so as to compress the bit stream at one or multiple layers.

In some embodiments, the one or more hierarchical algorithms are applied to one or more samples extracted from a plurality of layers. A sample may be visual data such as in a HEVC encoding or residual data such as in an SVC encoding. Samples may also comprise any of blocks, macroblocks, prediction units, coding units, patches, segments, shapes, groups of pixels, slices, tiles or single pixel values located at or between pixel positions. It will be appreciated that a sample may be any other suitable piece of data.

Figure 1:
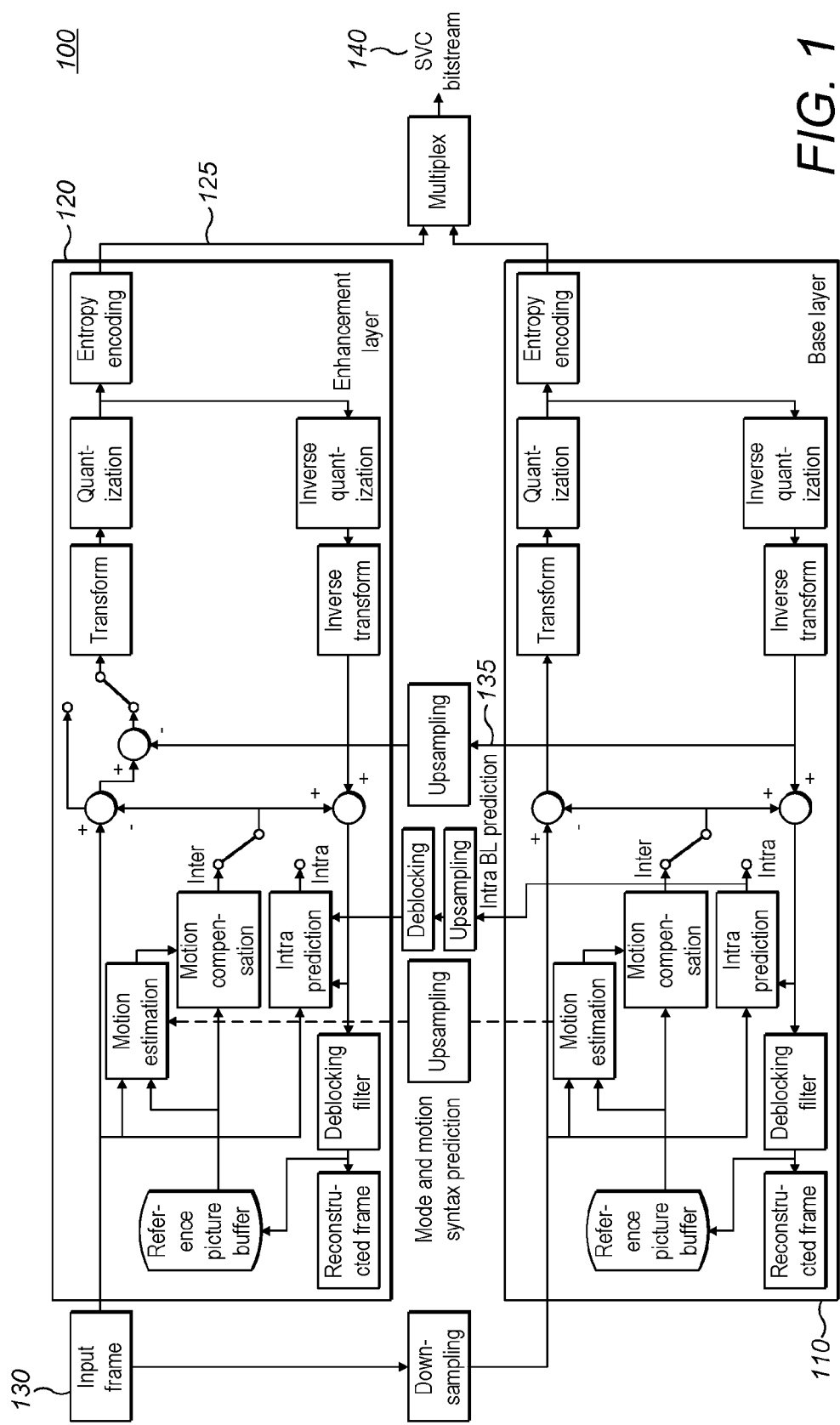
FIG. 1 illustrates a generic SVC encoder having two layers with inter-layer residual prediction.
Figure 2:
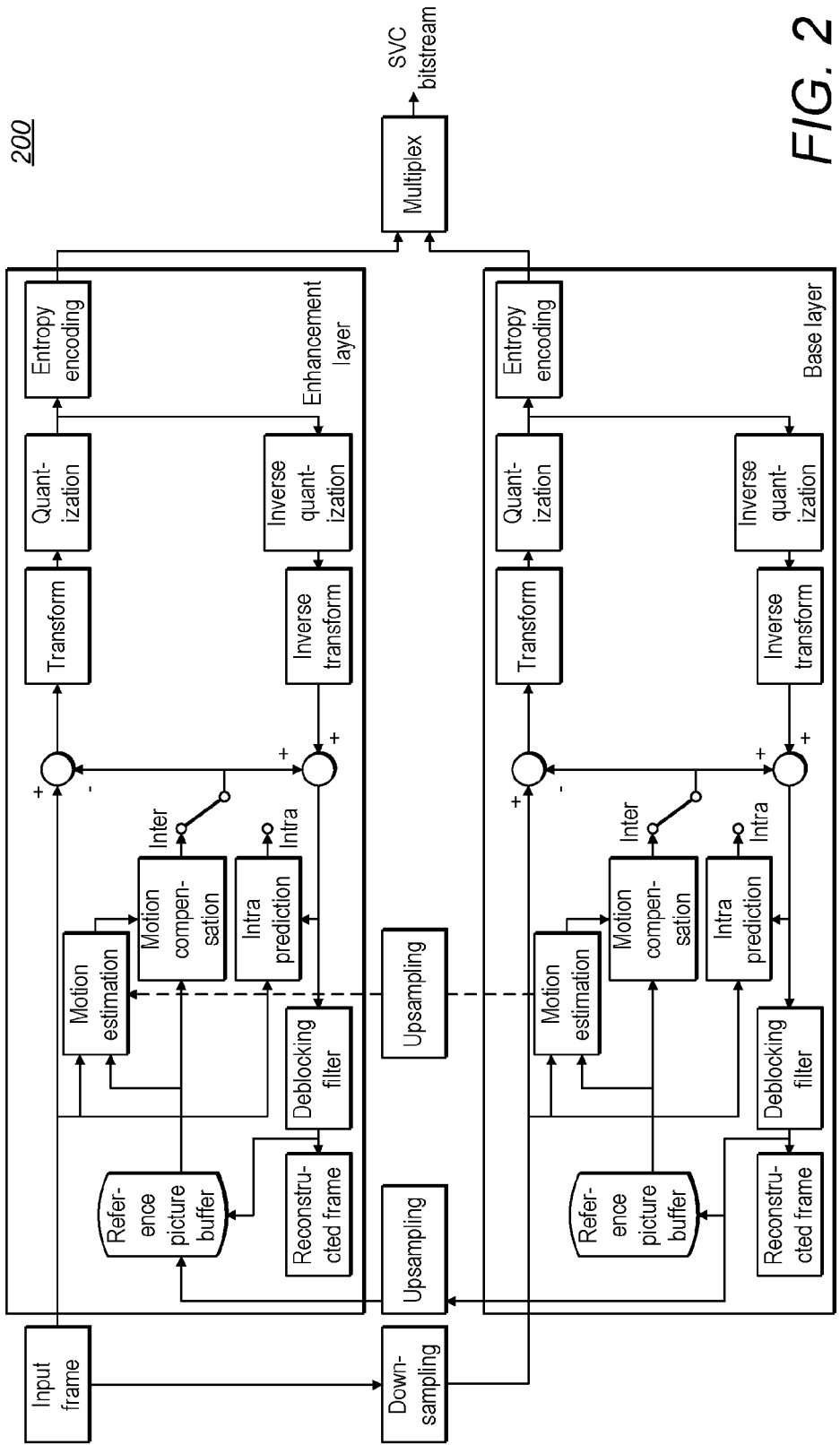
FIG. 2 illustrates a generic SVC encoder having two spatial layers.
Figure 3A:
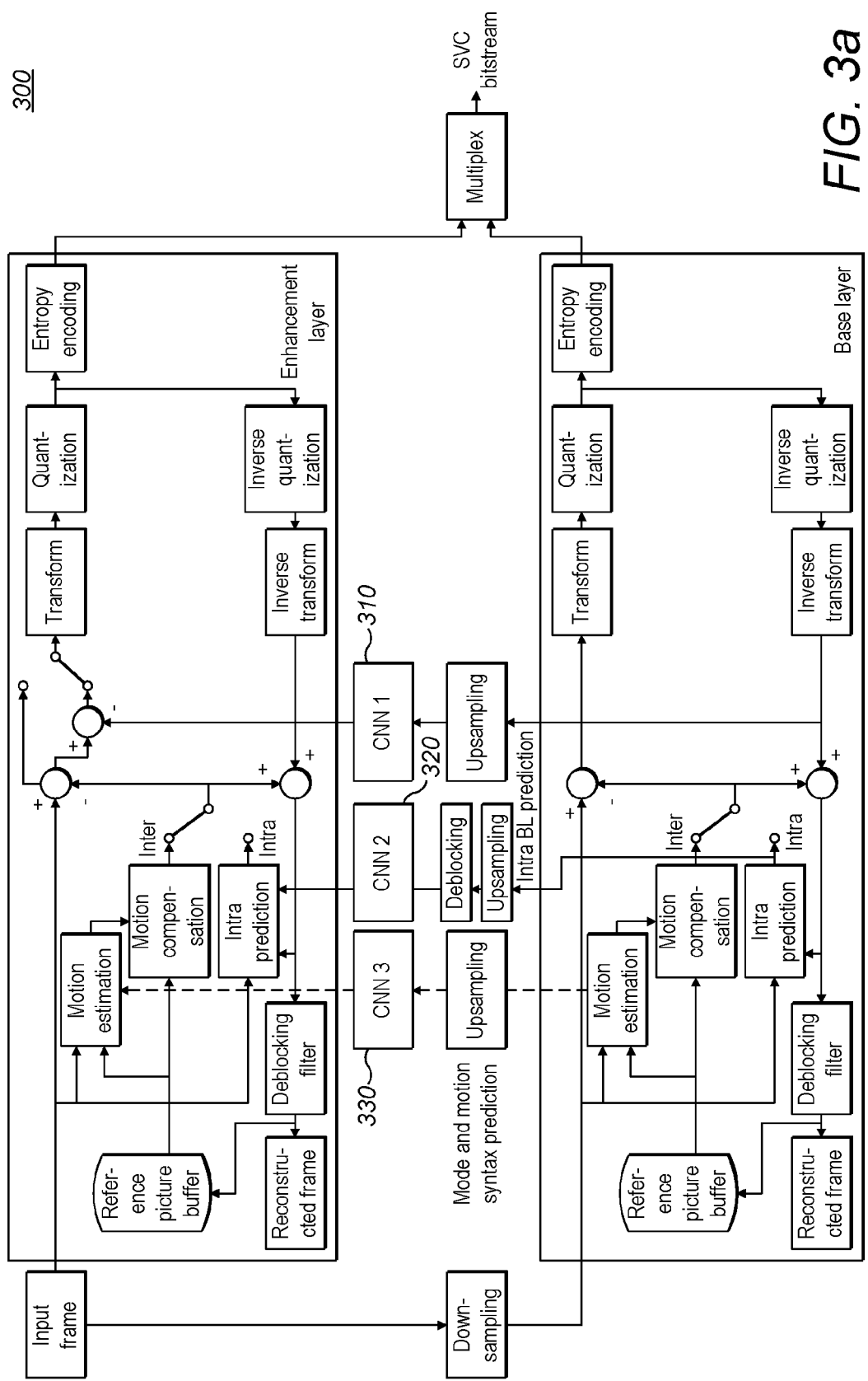
FIG. 3a illustrates a SVC encoder having two layers and applying convolutional neural networks for inter-layer prediction.
Figure 3B:
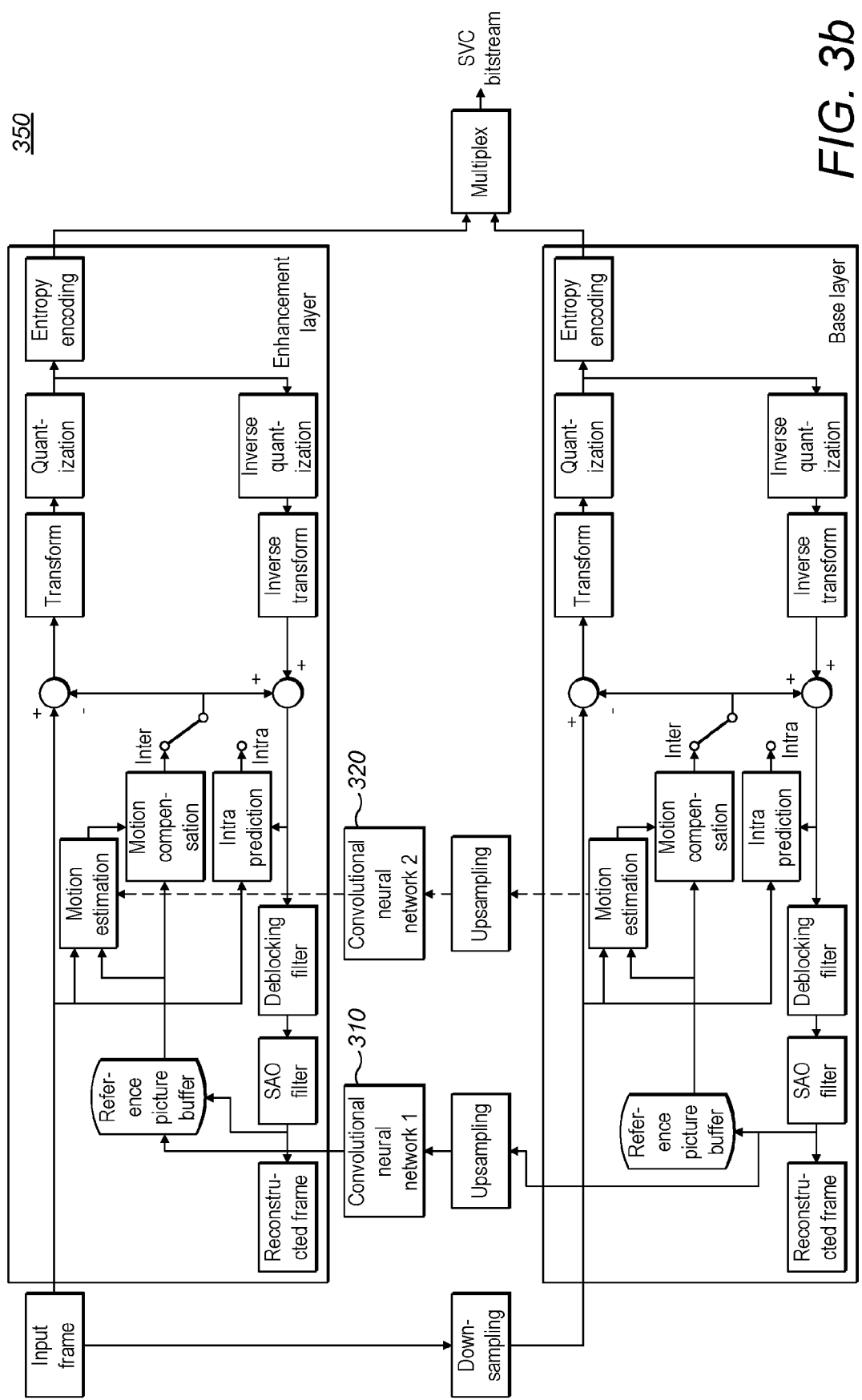
FIG. 3b illustrates a SHVC encoder having two layers and applying convolutional neural networks for inter-layer prediction.

A hierarchical algorithm may be applied to the extracted samples prior to any inter-layer prediction, with the aim of reducing the distortion between the samples in a lower layer and the samples in the current layer, such that the compression performance of the current layer is increased FIGS. 3a and 3b show an embodiment where a plurality of hierarchical algorithms 310, 320, 330, which in the examples shown are convolutional neural networks, are used between the layers so as to increase the compression performance. It will be appreciated that other hierarchical algorithms, such as recurrent neural networks, random forests, long-short term memory, memory networks, gated recurrent networks or a dictionary learning based method or methods may be used. Similarly, it will be appreciated that the hierarchical algorithm, regardless of type may be pre-trained, pre-defined, fine-tuned, self-updating, selected from a database or trained using a learning approach.

Figure 4:
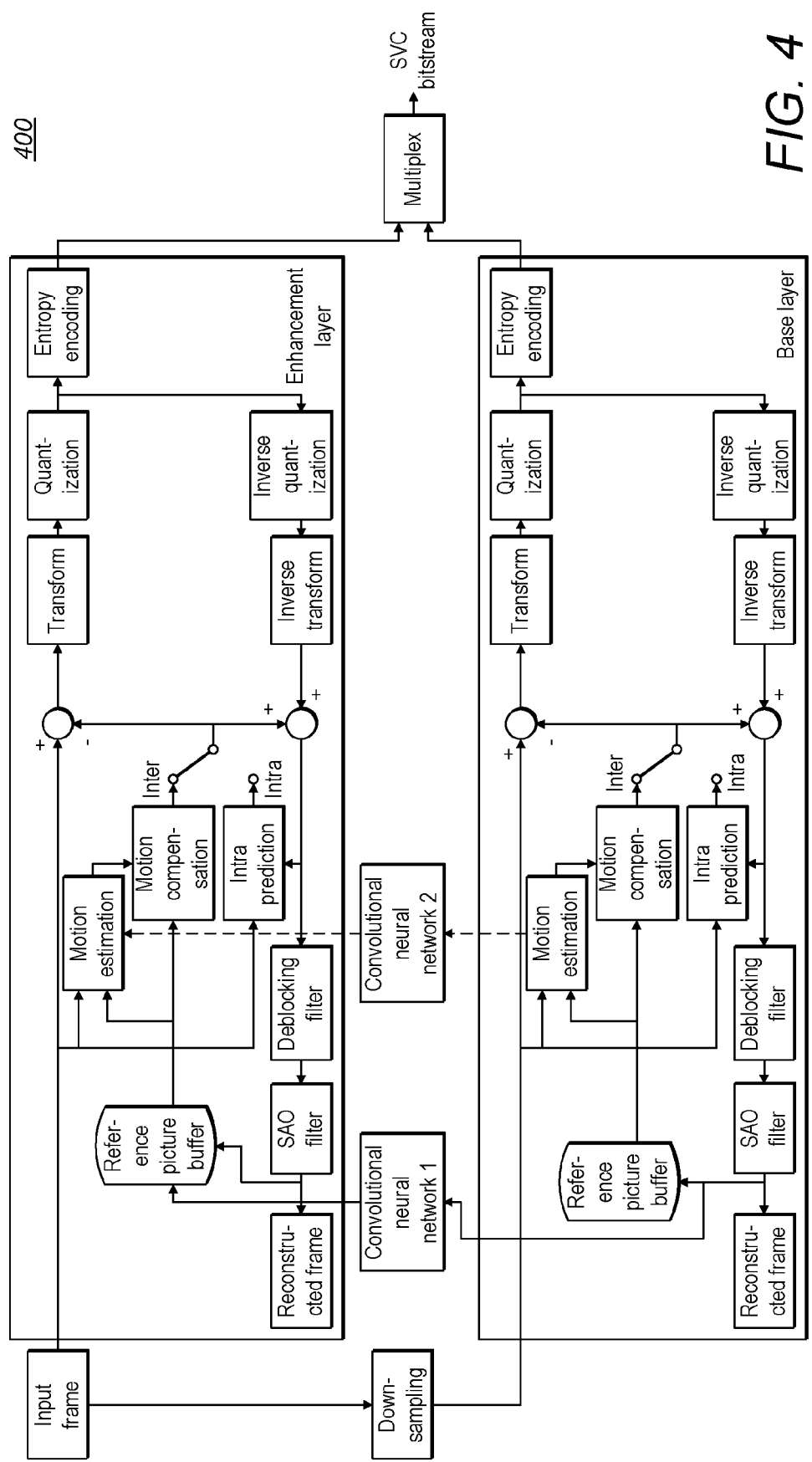
FIG. 4 illustrates a SHVC encoder having two layers with convolutional neural networks incorporating an up-sampling process.

FIGS. 3a and 3b, show an embodiment where an upscaling process, such as spatial up-sampling, occurs before the application of the hierarchical algorithm. However, in some embodiments, as shown in FIG. 4, the upscaling process may be integrated into the hierarchical algorithm. A further embodiment may be a combination of the two embodiments shown in FIGS. 3a, 3b and 4, wherein only some of the hierarchical algorithms incorporate the upscaling process.

Furthermore, it will be appreciated that in some embodiments, the one or more hierarchical algorithms may be different between the multiple components of for the base layer. In other embodiments, it will be appreciated the hierarchical algorithms may be identical between the different components of the base layer.

In the above embodiments, each component may be representative of any of a residual component, a visual data component, luma components, chroma components, transformed data, filter coefficients, syntax components, prediction modes, supplemental enhancement information components, or a motion data component. It will be appreciated other components may be appropriate and be able to be used by the method.

Furthermore, in some embodiments, the different components may communicate with each other either bilaterally or unilaterally with the aim of improving the processing of one or more of the components.

In some embodiments, there may be a plurality of layers wherein the processing occurs on all the inter-layer predictions for all layers of the bitstream. Such an embodiment may be represented by the configurations similar to those shown in FIG. 3a and FIG. 3b, wherein there are more than 2 layers. Alternatively, in embodiments, such as those shown in FIG. 3a and FIG. 3b, wherein there are more than 2 layers, the processing may occur only on some of layers. Regardless of whether the processing occurs on some or all of the layers, the hierarchical algorithms used for inter-layer predictions may be identical or may be similar, such that the components may communicate either unilaterally or bilaterally to improve the process.

Furthermore, some embodiments may enable the processing to occur on some or all of the blocks of pictures in one or more layers. In such embodiments, the processing may occur on any of I-pictures, Intra Random Access Point ('IRAP') pictures, or intra-encoded pictures. This enables the processing block to be adaptive to any input provided. In the case of a visual data input this may enable the processing block to be adaptive to the content of the visual data, or alternatively in another embodiment any stylisation data defining the visual data. In an alternative embodiment, the processing may occur only on some of the blocks of pictures in the one or more layers.

Figure 5:
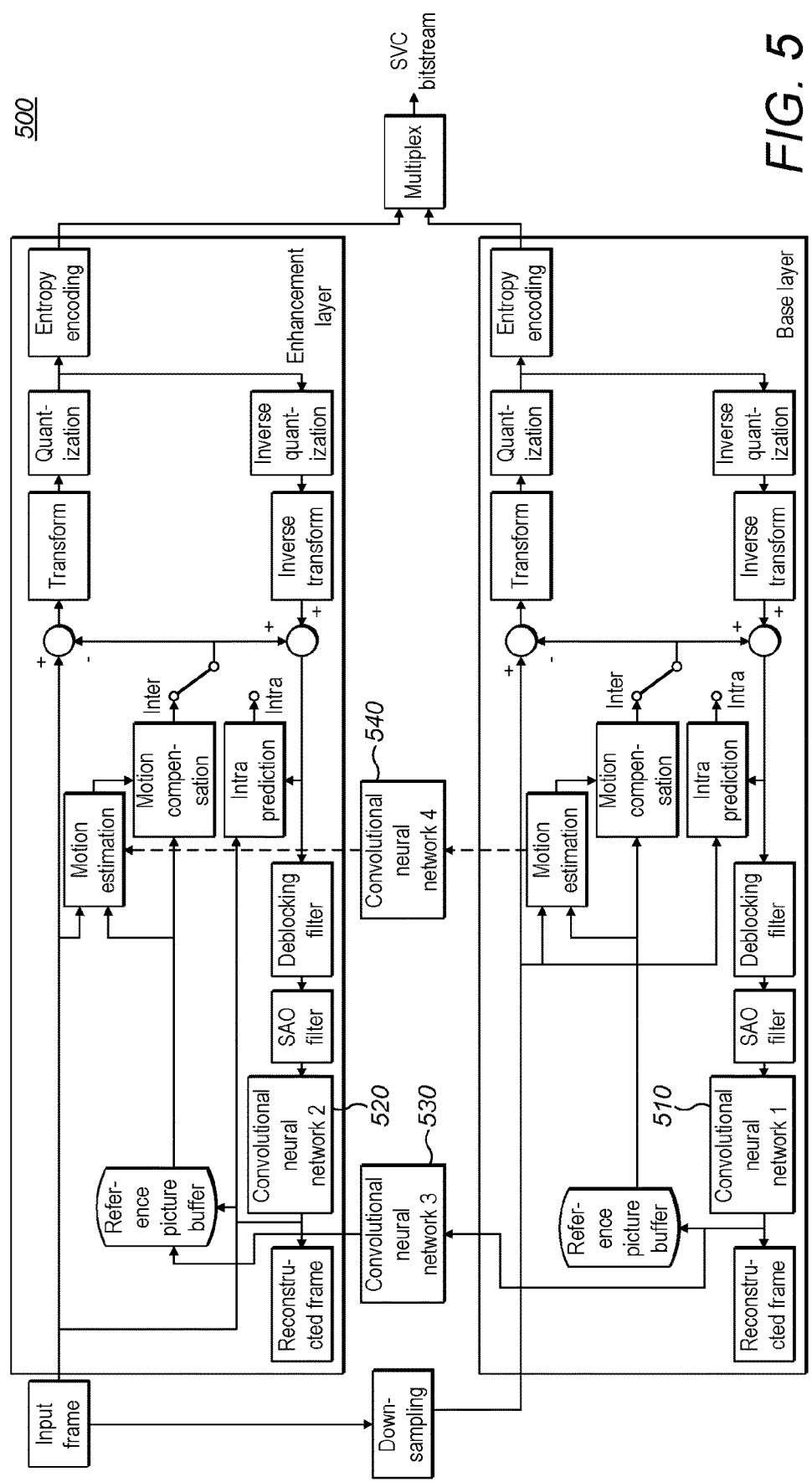
FIG. 5 illustrates a scalable encoder having two layers with convolutional neural networks wherein the single layer convolutional neural networks are used independently.

FIG. 5 shows an embodiment where the processing occurs after a post-processing convolutional neural network has been used to encode the base layer. It will be appreciated, however that other types of hierarchical algorithm may be used, said types mentioned above. Furthermore, in further embodiments, the hierarchical algorithm 510 used to post-process the base layer may be identical or different to the other hierarchical algorithms 520, 530, 540. The hierarchical algorithm used to post-process the input data enables an improved prediction of the base layer compression to be generated. Therefore, it may be desirable in some embodiments, to have different hierarchical algorithms with different goals.

In a further embodiment, the processing may only occur on a limited number of pictures from a GOP, this may include some inter-predicted pictures. Additionally, in a further embodiment, the limited number of pictures from the GOP may be indicated by an identifier for which inter-layer prediction will not be applicable.

Figure 6:
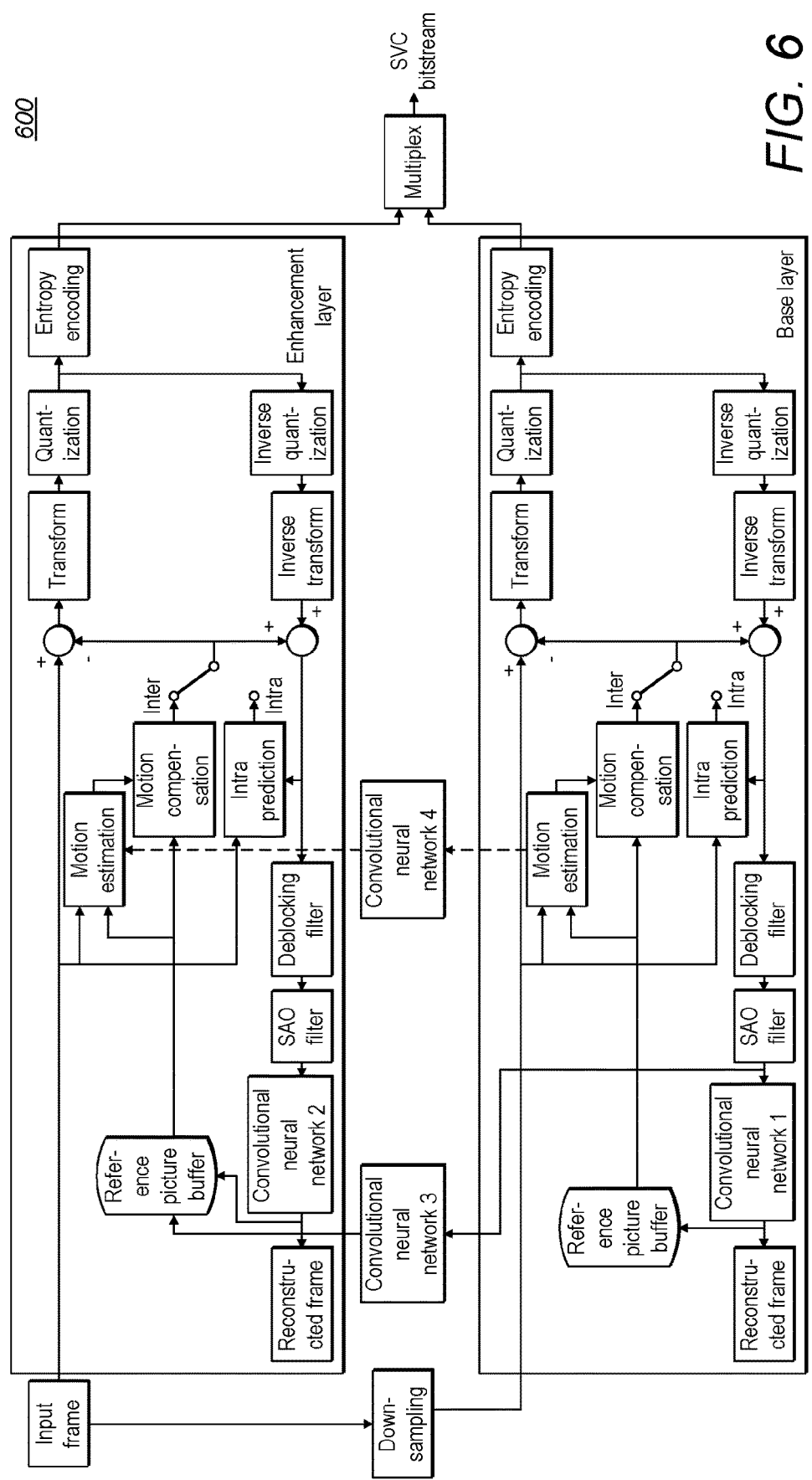
FIG. 6 illustrates a scalable encoder where the up-sampled signal is not a fully decoded picture of the base layer.

FIG. 6 shows a further embodiment where the processing occurs on samples which are not fully reconstructed in the base layer representation, an example of when this may occur is when a different hierarchical algorithm is used for reference pictures and inter-frame prediction, or where the hierarchical algorithms have different goals and/or optimisations. It will be appreciated that there are a number of other instances when this may occur.

Figure 7:
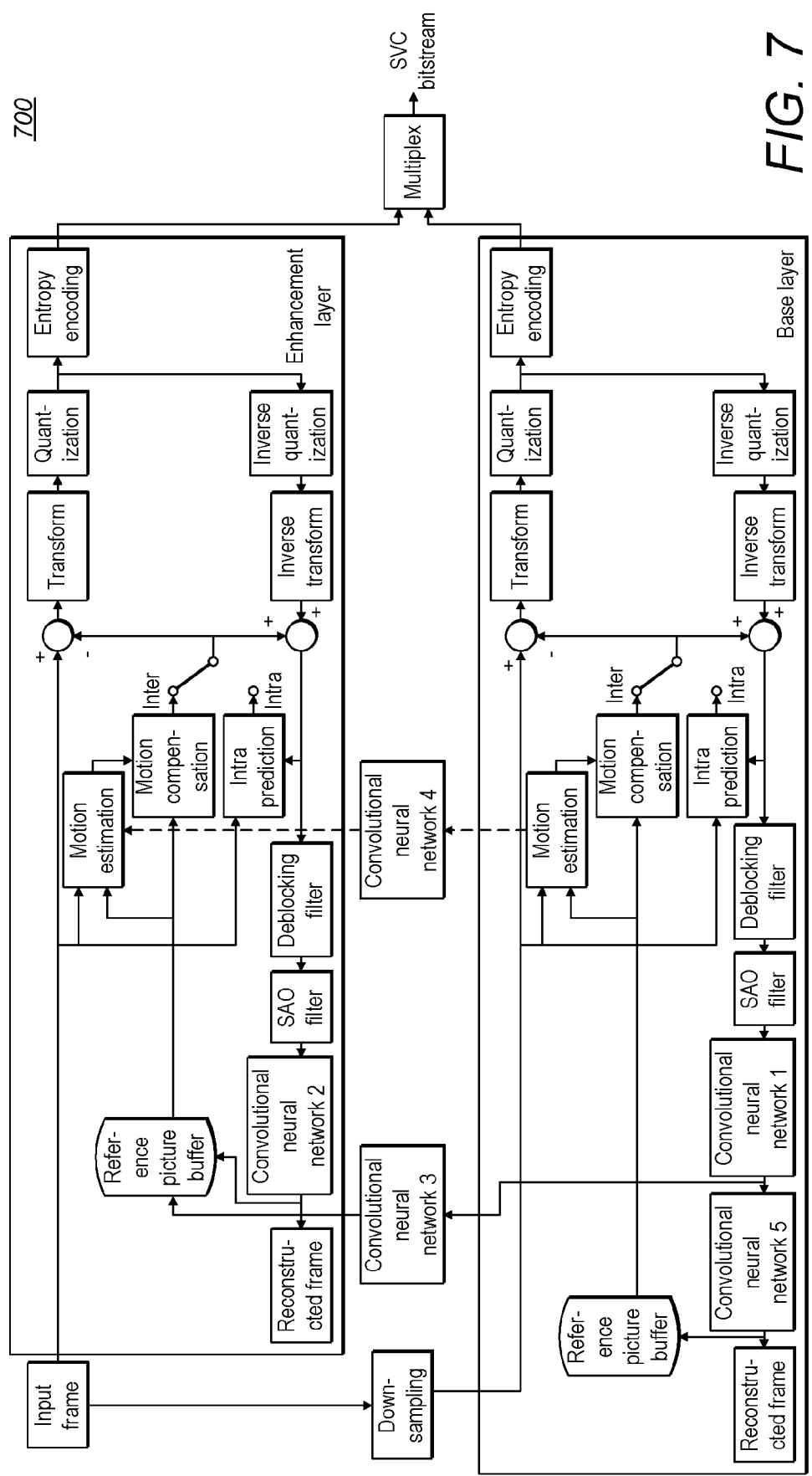
FIG. 7 illustrates a scalable encoder where the up-sampled signal is not a fully decoded picture of the base layer and the base layer, convolutional neural network and inter-layer prediction convolutional neural network share some layers of the convolutional neural network processing.

FIG. 7 shows a further embodiment, where the processing occurs on samples not fully reconstructed in the base layer representation, however in contrast to the embodiment shown in FIG. 6, the hierarchical algorithms share one or more hierarchical algorithm layers with the hierarchical algorithm of the base layer process. This enables a reduction in the complexity when the one or more hierarchical algorithm layers are shared between both operations.

Some embodiments may use one or more hierarchical algorithms to generate a higher resolution version of the samples for inter-layer prediction on a block, picture or sub-picture basis. In such embodiments, a sub-picture basis may comprise a group of blocks, tiles, or slices, however it will be appreciated other components may be used.

In an alternative embodiment, different hierarchical algorithms may be applied to different blocks of a layer, for example embodiments shown in FIGS. 3 through 7 may be modified to have multiple hierarchical algorithms for each component arranged in parallel.

Figure 8:
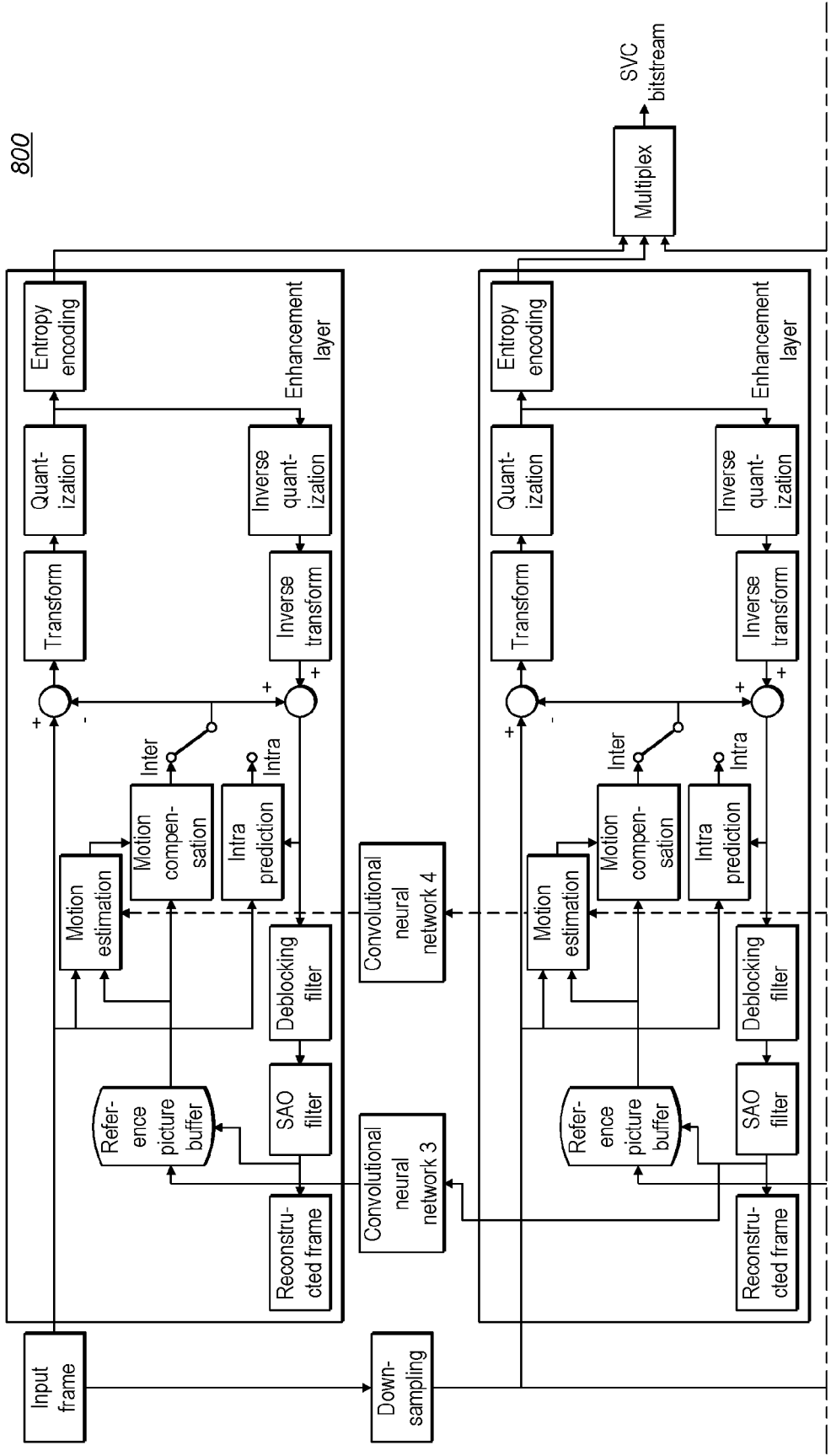
FIG. 8 illustrates a scalable encoder with different convolutional neural networks between multiple layers.
Figure 8:
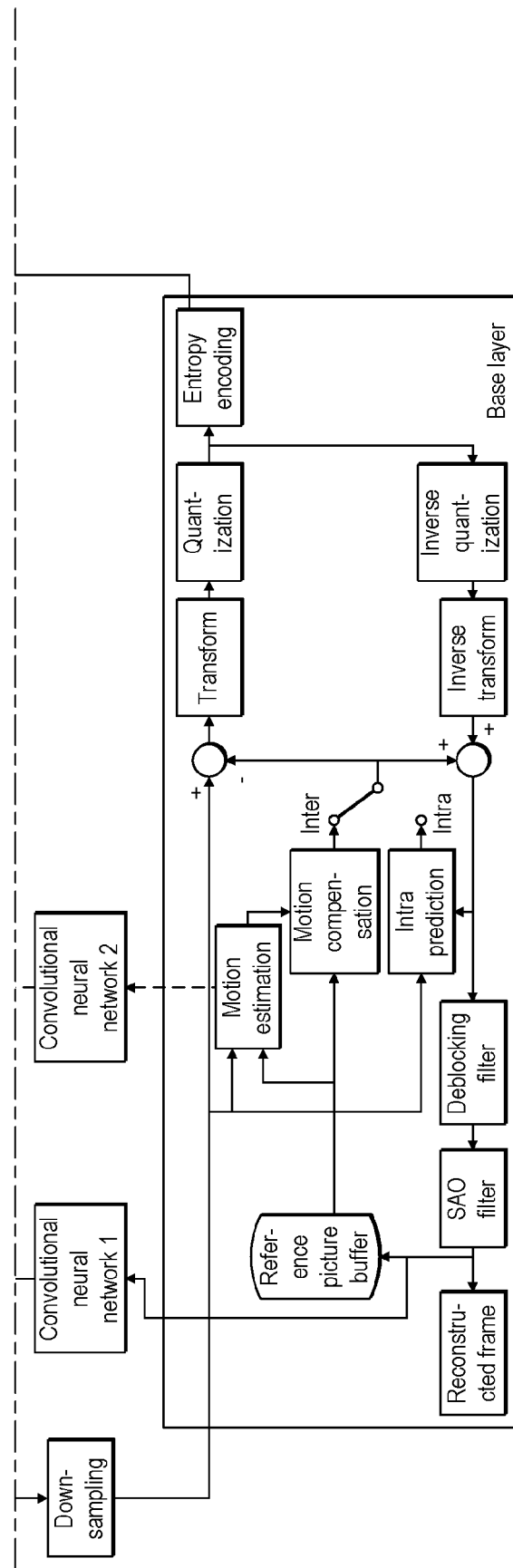

FIG. 8 shows a scalable encoder according to an embodiment, wherein there are different convolutional neural networks between each layer. It will be appreciated that other embodiments may have more than three layers incorporating two enhancement layers and a base layer. It will be further appreciated that other hierarchical algorithm types may be used and the embodiment is not limited to using only convolutional neural networks. In fact, the embodiment may use multiple different types of hierarchical algorithm.

Figure 9:
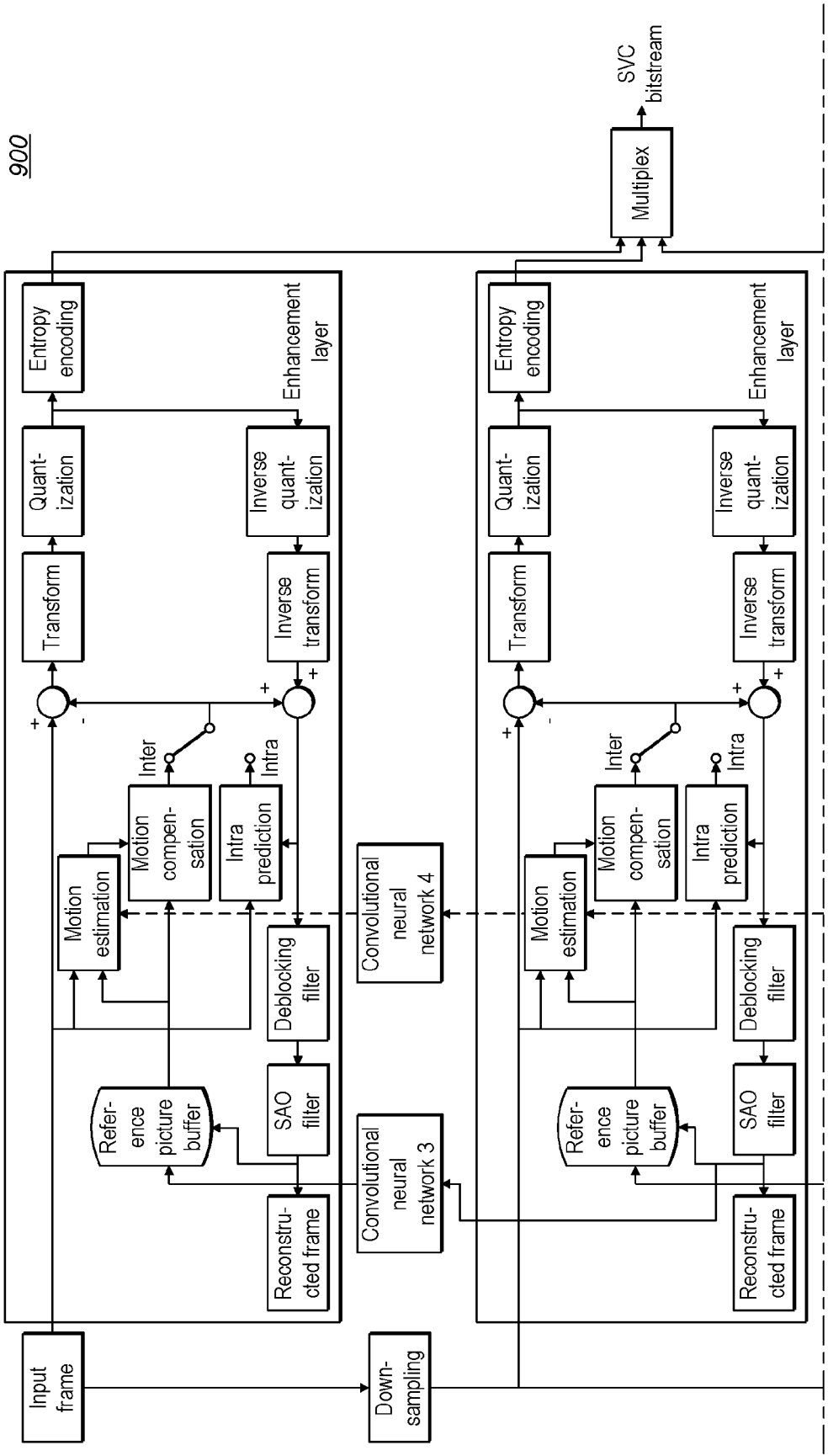
FIG. 9 illustrates a scalable encoder with different convolutional neural networks for different enhancement layers using the same base layer.
Figure 9:
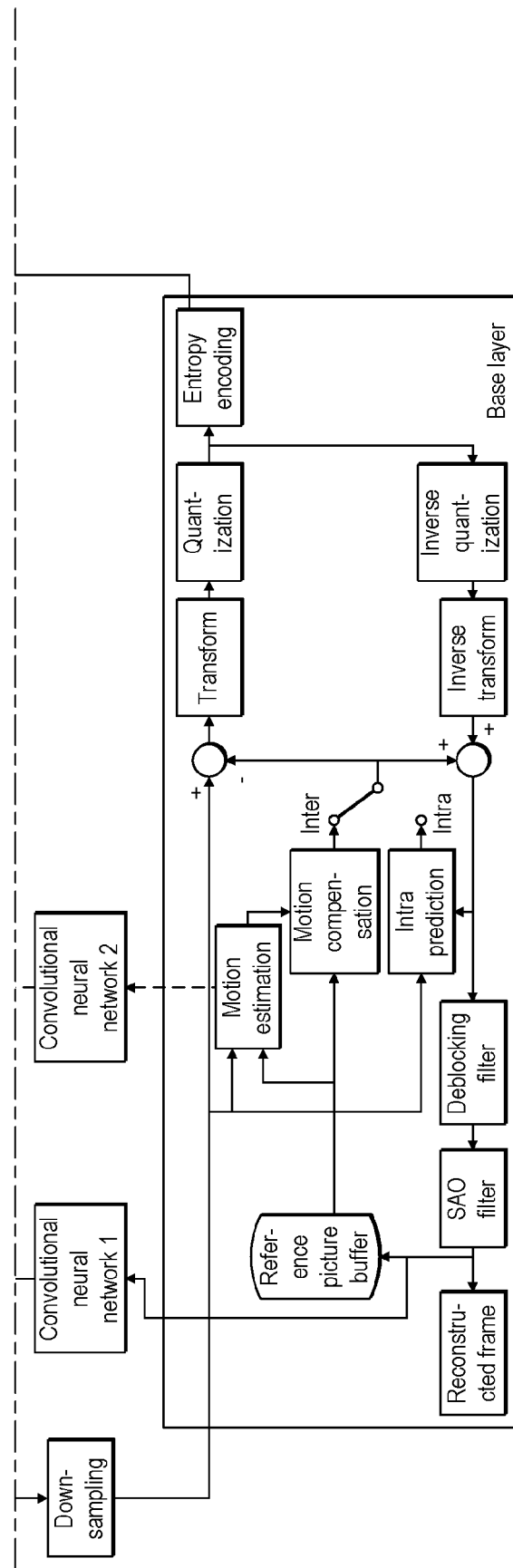

FIG. 9 shows a further embodiment, wherein different hierarchical algorithms are applied between different enhancement layers when the same base layer is used in an architecture for branched inter-layer prediction. SVC allows for multiple enhancement layers to exist without dependencies. This also allows for a network node to remove one of the enhancement layers without affecting a different higher quality representation. In such embodiments, different hierarchical algorithms may be used between the base and each enhancement layer. For example, a low quality, low resolution base layer may be used, and for one type of device, a high quality, low resolution enhancement layer may be used, and for another type of device, a low quality, high resolution enhancement layer may be used. In such examples, a network node may drop the enhancement layer which is not required for that device, such that the bit rate for transmission is reduced. It will be appreciated other examples of this embodiment may require varying degrees of quality and resolution to create any number of different enhancement layers for different devices.

Figure 10:
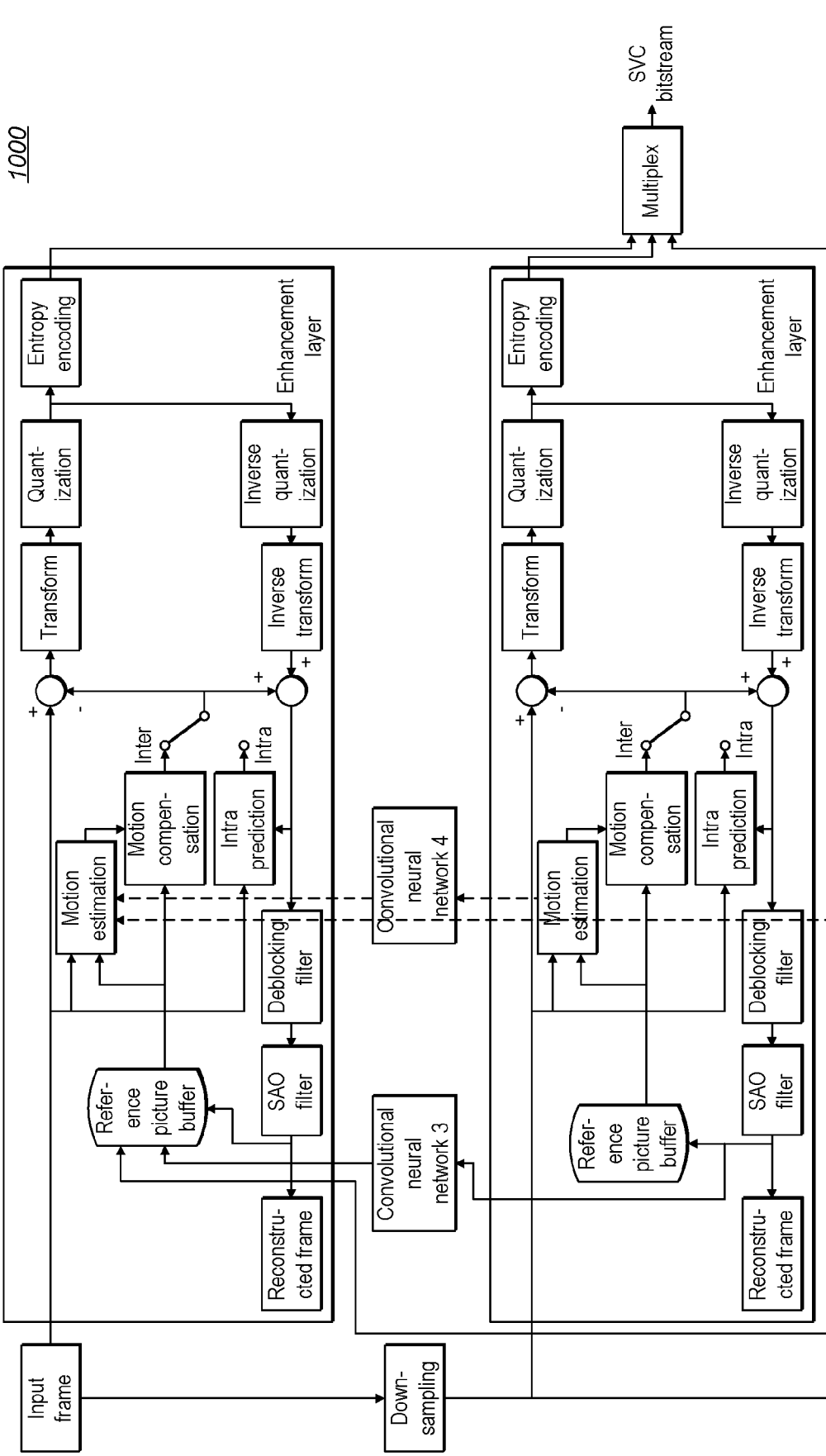
FIG. 10 illustrates a scalable encoder with different convolutional neural networks with different base layer pictures.
Figure 10:
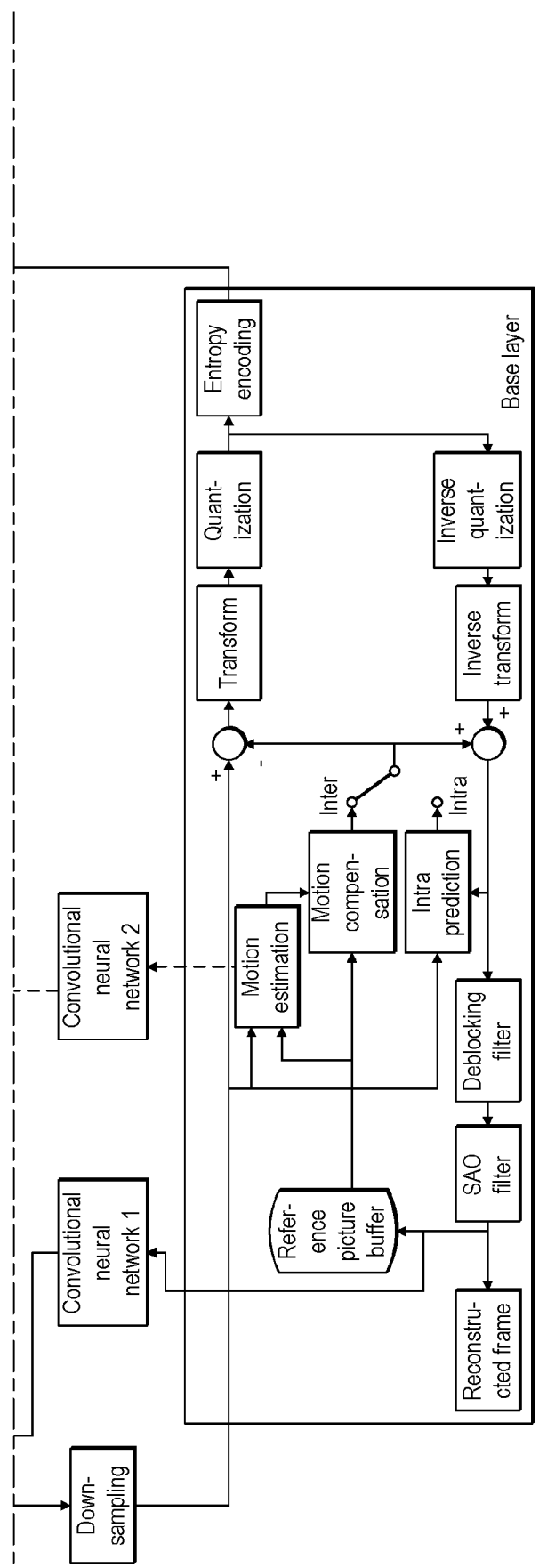

FIG. 10, shows a further embodiment wherein different hierarchical algorithms are applied to samples from one or more lower layers to create one or more predictions for any of the one or more enhancement layers. This allows for information on the lower layers to assist in generating predictions for the current layer.

In a further embodiment, multiple hierarchical algorithms may be applied on the same set of samples and stored for future inter-layer prediction. This enables multiple pictures to be generated for inter-layer prediction.

Figure 11:
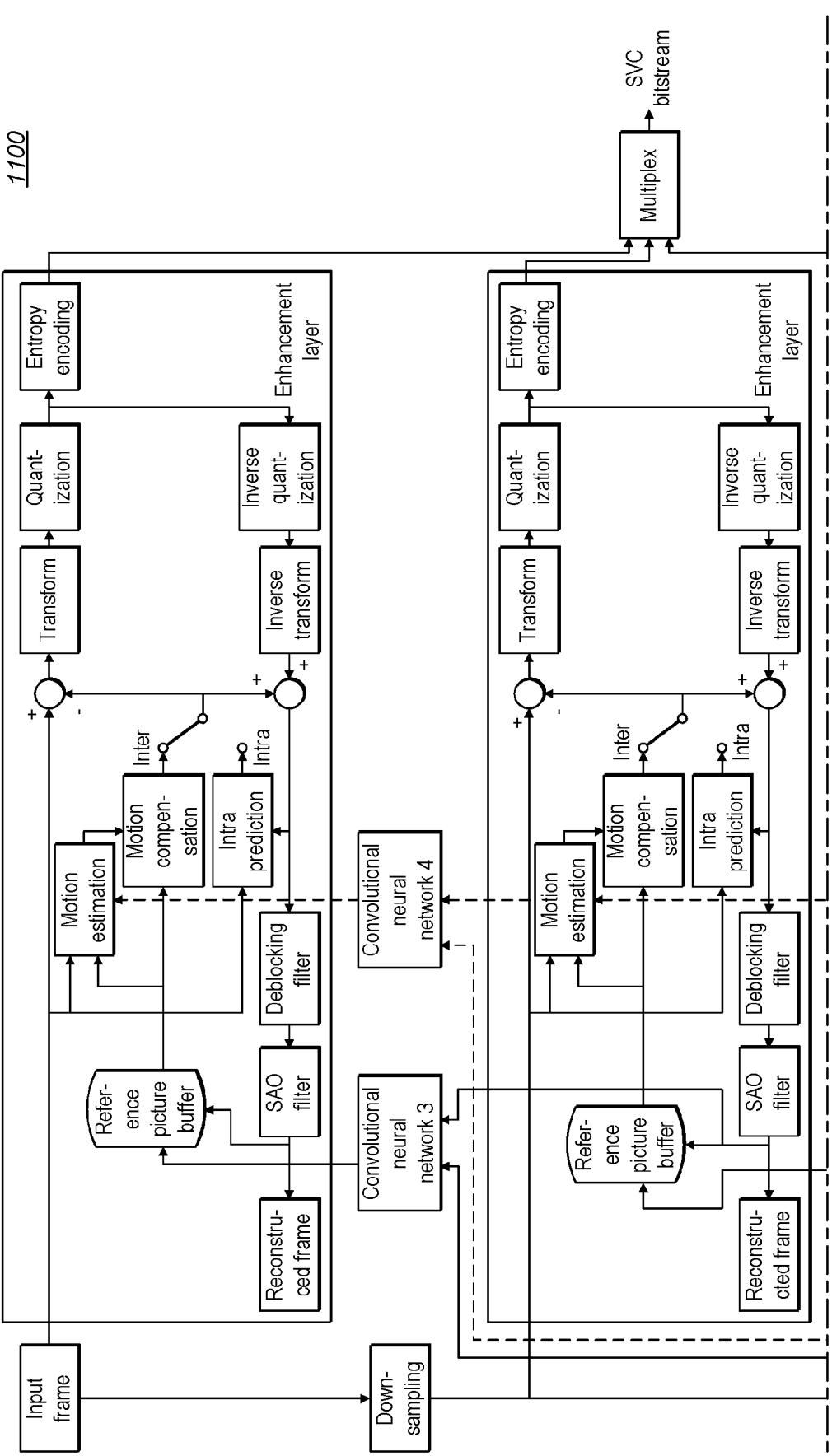
FIG. 11 illustrates a scalable encoder with convolutional neural networks with multiple input samples from multiple sources.
Figure 11:
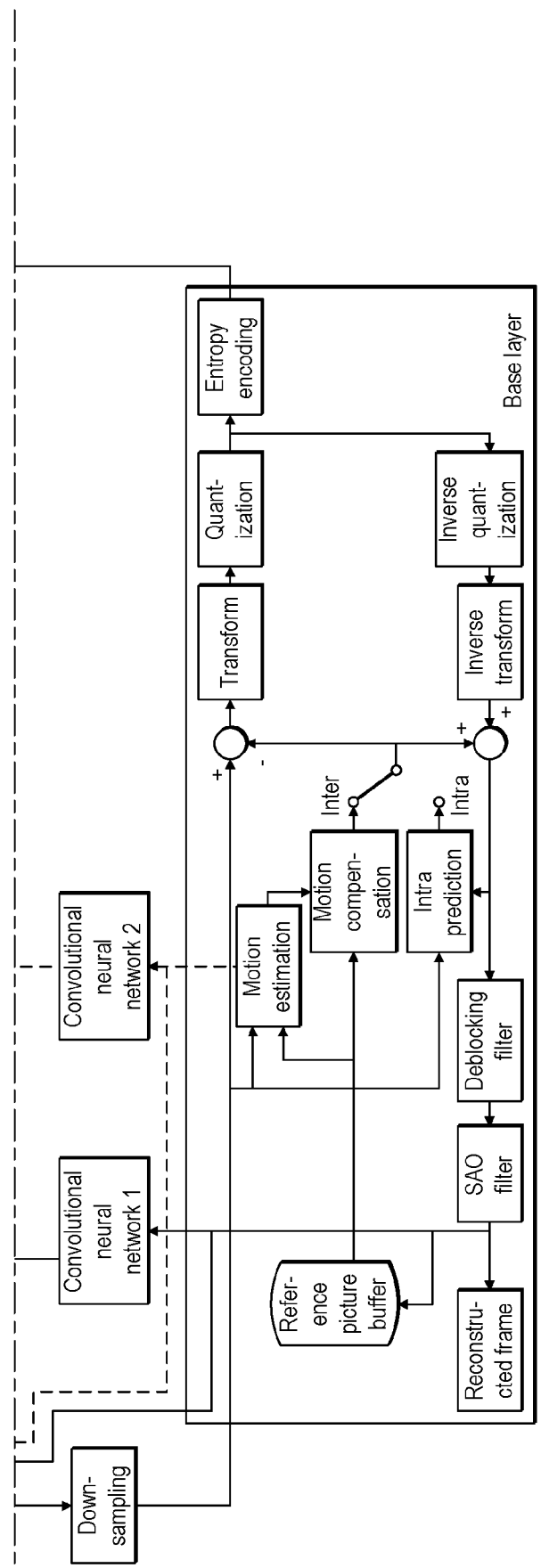

FIG. 11 shows another embodiment, wherein an input provided to the method are pictures from different layers, and the output of each layer is one or more predicted enhancement layer pictures. For example when there is a high quality, low resolution, base layer and a low quality, high resolution a combination of these two layers may result in a more beneficial prediction.

It may be desirable to use the hierarchical algorithms to predict the motion vector of higher layers, predict the delta motion vector compared to the base layer, and predict the portioning of a group of pixels, which may be determined by macroblock partitioning, CU-splitting, or superblock-subdivision. This may be done over multiple components. It may also be desirable to apply the one or more hierarchical algorithms to one or more output reference pictures such as one or more golden reference frames selected from the one or more previously received frames and/or from the received visual data.

Figure 12:
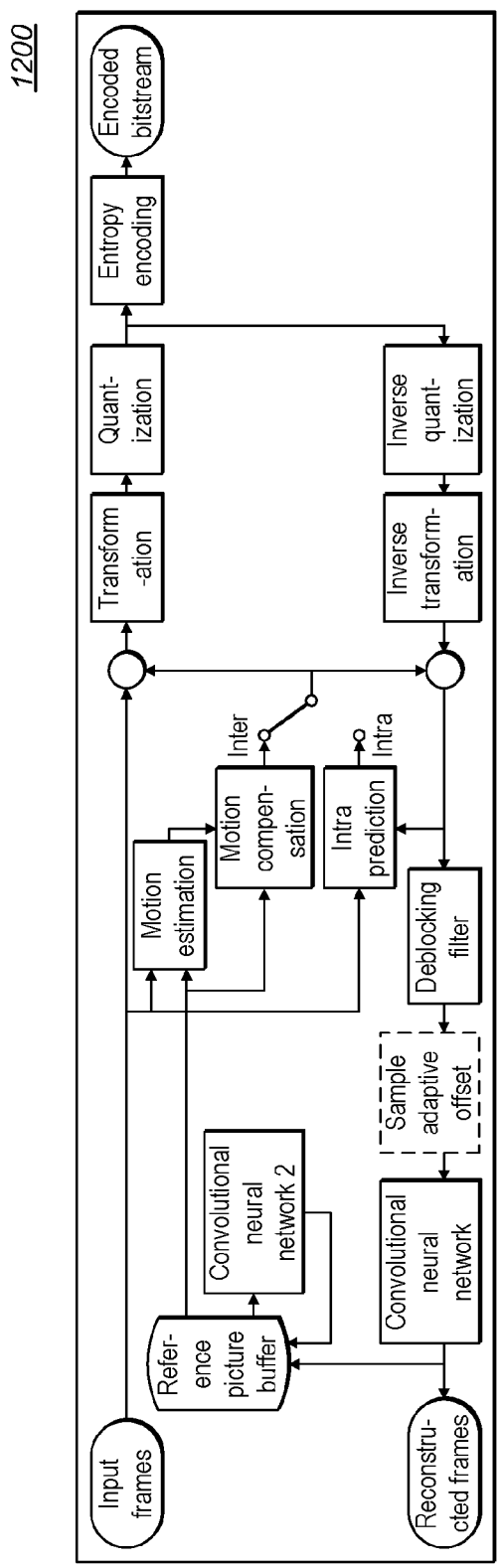
FIG. 12 illustrates an encoder for filtering buffered pictures to enhance quality, create a low resolution representation, and/or create a high resolution representation using a convolutional neural network.

FIG. 12 shows another embodiment, wherein the hierarchical algorithm may be applied to one or more pictures within the same spatial layer when the resolution of the layer is changed adaptively. As with a previous embodiment wherein the up-scaled reference pictures are fed-back to the other layers of the method, this may occur entirely within each layer. Furthermore, in some embodiments, one or more previously decoded and stored reference pictures may be used to reduce the distortion between the reference pictures and the current pictures. Alternatively, previous operations, such as the one shown in FIG. 12, may be applied to the reference pictures of different layer, and use them for temporal prediction of the current layer. For example, it may be desirable to drop the enhancement layer, such that the base layer will be decoded or additional bit rates become available and enhancement pictures may then be generated, this is especially beneficial when the GOP size is such that the wait would be too long before the next intra-predicted picture is generated. This is particularly the case when the different layers have different frame rates, for example 24 fps and 29.97 (30000/1001) fps, the temporally intermediate frames for the base layer may assist the enhancement layer prediction.

Figure 13:
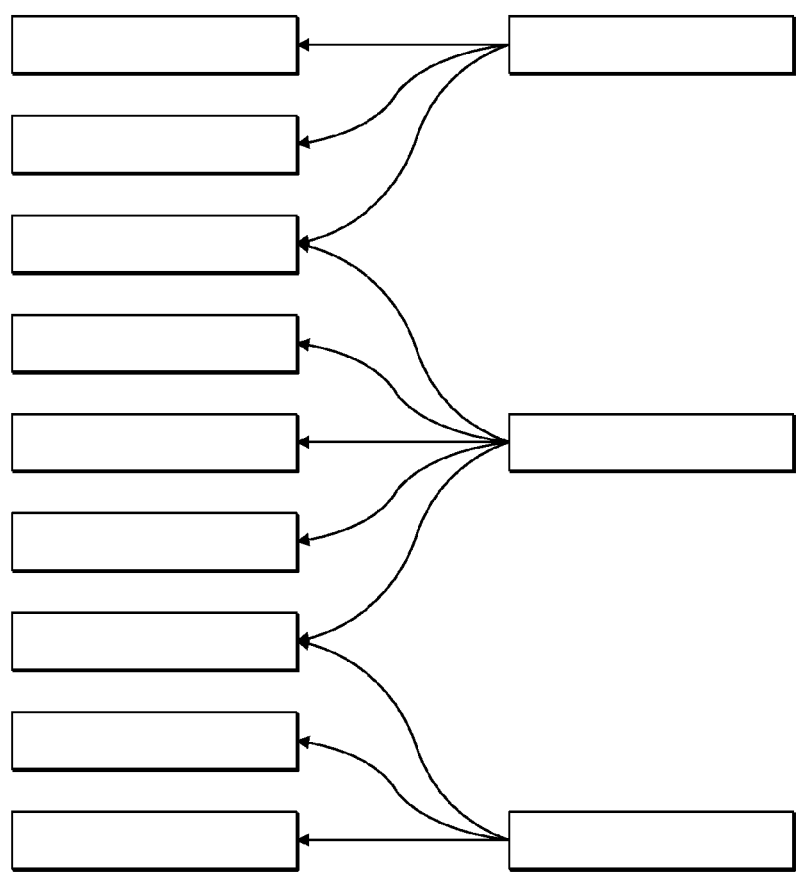
FIG. 13 illustrates diagonal inter-layer prediction using inter-layer prediction from temporally non-co-located pictures.

FIG. 13 shows yet a further embodiment, wherein the hierarchical algorithm may be applied to the base layer pictures which are used to predict higher layer pictures which are not temporally co-located, sometimes known as a diagonal intra-layer prediction, which is not a common feature of SVC or SHVC. This results in no additional reference pictures being created for the temporal co-located position of the base layer, but directly improving a decoded picture using a hierarchical algorithm.

Figure 14:
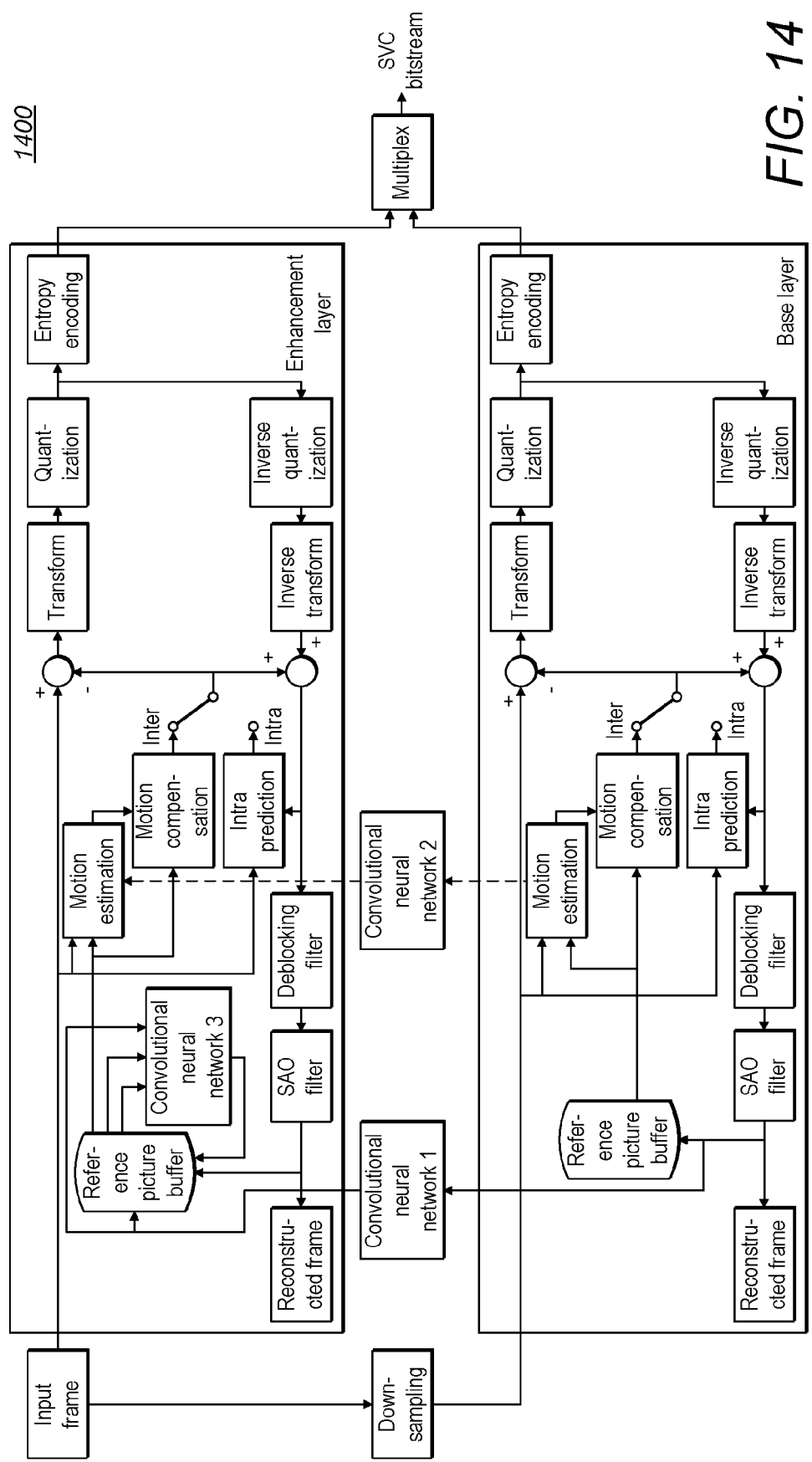
FIG. 14 illustrates an encoder using convolutional neural networks to generate a new prediction of the current picture using temporally co-located and non-co-located pictures of the current and base layer, and wherein the resulting picture is stored in a reference picture buffer.

FIG. 14 shows a further embodiment, wherein one or more hierarchical algorithms may be applied in parallel on input samples from one or more temporal reference pictures of the same layer, and/or with input samples from a temporally co-located base layer picture and/or with input samples from one or more temporally non-co-located base layer pictures which have been previously decoded—for example, when the enhancement layer has a high frame rate. These input samples may have had a hierarchical algorithm previously applied to it, which may be different to the hierarchical algorithm applied in parallel to the input samples. The resulting picture may then be stored in a reference picture buffer. This may be desirable to produce temporally up-scaled pictures wherein the generated base layer predictions will have information on the motion displacement, and where in the enhancement layer picture may provide additional quality due to a higher fidelity. All the hierarchical algorithms may then be combined into a single hierarchical algorithm. In some embodiments, multiple reference pictures may be generated using the same hierarchical algorithms, enabling multiple different temporal representations to be generated with a previous hierarchical algorithm. Alternatively, multiple hierarchical algorithms may be used in parallel and each resulting picture stored as depending on the temporal position a different hierarchical algorithm may have more optimal results.

Figure 15:
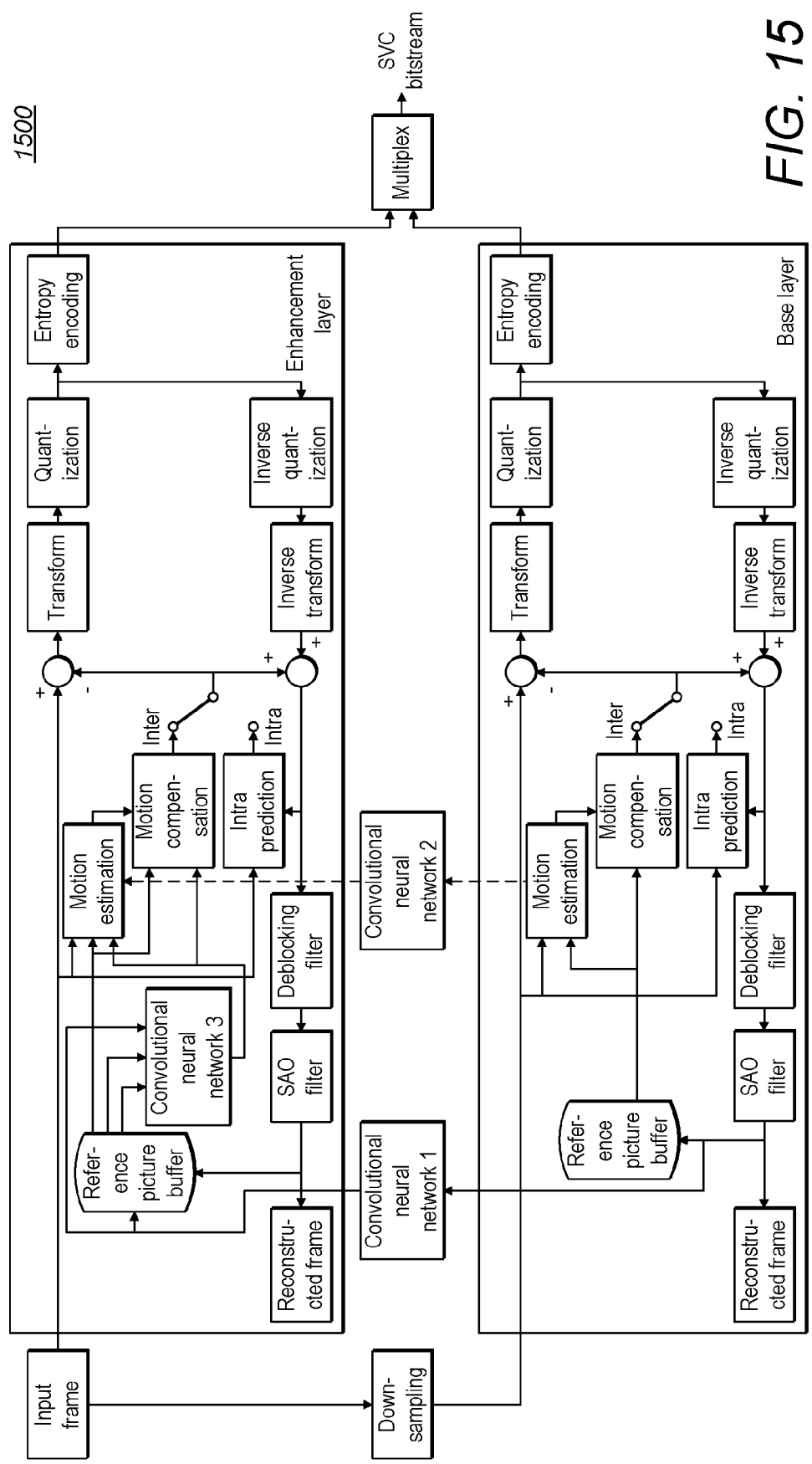
FIG. 15 illustrates a scalable encoder using convolutional neural networks to generate a new prediction of the current picture using temporally co-located and non-co-located pictures of the current and base layer, and wherein the resulting samples are used for motion estimation and/or motion compensation.

Further embodiments may use a hierarchical algorithm to reconstruct pictures of the base layer and the enhancement layer to generate a prediction of the current picture of the enhancement layer. The reconstructed pictures may be temporally co-located or non-co-located with the current picture. As shown in FIG. 15, the reconstructed pictures may optionally have a hierarchical algorithm previously applied with the aim at motion compensation. As such the resulting picture may not be stored in the reference picture buffer. As with other embodiments, multiple reference pictures may be generated using the same hierarchical algorithm, or alternatively or in addition to the above, one or more generated pictures may be used for motion estimation and or motion compensation. In such embodiments, one or more of the generated pictures may be stored in the reference picture buffer.

Furthermore, the embodiment shown in FIG. 15 may be adapted to have multiple lower layers, wherein the one or more hierarchical algorithms may take input samples from multiple temporal reference pictures of the same layer and/or input samples from a temporally co-located base layer picture and/or input samples from multiple lower layers, wherein the input samples are temporally co-located or non-co-located.

In some embodiments, a hierarchical algorithm may be used to down-sample and generate one or more lower resolution representations in a non-normative manner. In such embodiments, the down-sampling may be used as a pre-filtering step; however there may be optional signalling used to signal that a hierarchical algorithm has been used for down-sampling.

In yet a further embodiment, the hierarchical algorithm may be used for determining a viewpoint of a 3D screen, wherein the resolution of a first viewpoint is different to the resolution of one or more further viewpoints. The one or more layers associated with the input data may comprise a plurality of viewpoints in a frame packed arrangement such that one or more enhancement layers may be used to improve the resolution of the one or more further viewpoints. The hierarchical algorithms may also be used to synthesise viewpoints, which may be used for inter-frame prediction, or to create a multi-view output, or to create a single view output of a non-transmitted viewpoint of a scene.

It will be appreciated that in any of the above mentioned embodiments, a hierarchical algorithm, such as the convolutional neural networks shown in the Figures, may be pre-defined, self-updating, selected out of a number of pre-defined hierarchical algorithms through the transmission of an index, selected out of a number of pre-defined hierarchical algorithms through an automatic classification of the input data, a self-updating pre-defined hierarchical algorithm, and/or reset to a pre-defined state or states (where multiple hierarchical algorithms are used). In some embodiments where the state or states are reset, it will be appreciated that not all states may be reset, and only a subset of the states are reset. Furthermore, in some embodiments, it will be appreciated that the hierarchical algorithm or algorithms themselves may be received and/or partially updated. It will also be appreciated that a hierarchical algorithm may be any of a convolutional neural network, recurrent neural networks, random forests, long-short term memory, memory networks, gated recurrent networks or a dictionary learning based method or methods. Furthermore, in embodiments where multiple hierarchical algorithms are used, it will be appreciated that the same hierarchical algorithm or same type of hierarchical algorithm does not need to be used throughout the method described in the embodiment. It will also be appreciated that the hierarchical algorithm may operate in a linear or non-linear space.

In FIGS. 3 through 12, 14 and 15 where there are references to Convolutional Neural Networks, for example CNN1, CNN2, CNN3 in FIG. 3*a*, it will be appreciated that alternative hierarchical algorithms, for example as set out above, may be employed.

Furthermore, in any of the above mentioned embodiments, the hierarchical algorithms may run in parallel with other hierarchical algorithms operating on the same input and generating an output for the same prediction. It will also be appreciated that the hierarchical algorithms may incorporate service oriented architectures and/or de-blocking filters and/or any other post filters as applicable. It will also be appreciated that the hierarchical algorithms, where appropriate may share layers of other hierarchical algorithms so as to generate an inter-layer prediction which may form part of a reconstructed output path.

The above described methods can be implemented at a node within a network, such as a content server containing video data, as part of the video encoding process prior to transmission of the video data across the network.

Any system feature as described herein may also be provided as a method feature, and vice versa. As used herein, means plus function features may be expressed alternatively in terms of their corresponding structure.

Any feature in one embodiment may be applied to other embodiments, in any appropriate combination. In particular, a method embodiment may be applied to a system embodiment, and vice versa. Furthermore, any, some and/or all features in one embodiment can be applied to any, some and/or all features in any other embodiment, in any appropriate combination.

It should also be appreciated that particular combinations of the various features described and defined in any embodiments can be implemented and/or supplied and/or used independently.

Some of the example embodiments are described as processes or methods depicted as diagrams. Although the diagrams describe the operations as sequential processes, operations may be performed in parallel, or concurrently or simultaneously. In addition, the order or operations may be re-arranged. The processes may be terminated when their operations are completed, but may also have additional steps not included in the figures. The processes may correspond to methods, functions, procedures, subroutines, subprograms, etc.

Methods discussed above, some of which are illustrated by the diagrams, may be implemented by hardware, software, firmware, middleware, microcode, hardware description languages, or any combination thereof. When implemented in software, firmware, middleware or microcode, the program code or code segments to perform the relevant tasks may be stored in a machine or computer readable medium such as a storage medium. A processing apparatus may perform the relevant tasks.

Figure 16:
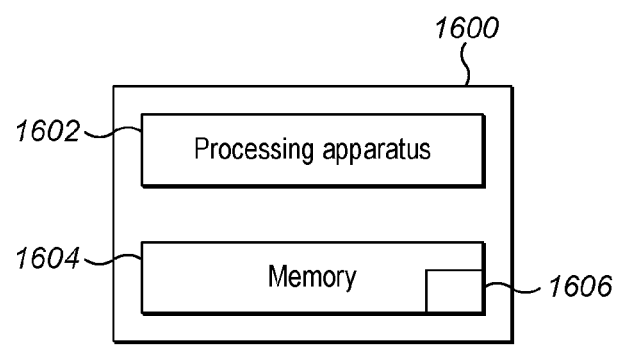
FIG. 16 shows an apparatus comprising a processing apparatus and memory according to an exemplary embodiment.

FIG. 16 shows an apparatus 1600 comprising a processing apparatus 1602 and memory 1604 according to an exemplary embodiment. Computer-readable code 1606 may be stored on the memory 1604 and may, when executed by the processing apparatus 1602, cause the apparatus 1600 to perform methods as described here, for example a method with reference to FIGS. 5 to 9.

The processing apparatus 1602 may be of any suitable composition and may include one or more processors of any suitable type or suitable combination of types. Indeed, the term "processing apparatus" should be understood to encompass computers having differing architectures such as single/multi-processor architectures and sequencers/parallel architectures. For example, the processing apparatus may be a programmable processor that interprets computer program instructions and processes data. The processing apparatus may include plural programmable processors. Alternatively, the processing apparatus may be, for example, programmable hardware with embedded firmware. The processing apparatus may alternatively or additionally include Graphics Processing Units (GPUs), or one or more specialised circuits such as field programmable gate arrays FPGA, Application Specific Integrated Circuits (ASICs), signal processing devices etc. In some instances, processing apparatus may be referred to as computing apparatus or processing means.

The processing apparatus 1602 is coupled to the memory 1604 and is operable to read/write data to/from the memory 1604. The memory 1604 may comprise a single memory unit or a plurality of memory units, upon which the computer readable instructions (or code) is stored. For example, the memory may comprise both volatile memory and non-volatile memory. In such examples, the computer readable instructions/program code may be stored in the non-volatile memory and may be executed by the processing apparatus using the volatile memory for temporary storage of data or data and instructions. Examples of volatile memory include RAM, DRAM, and SDRAM etc. Examples of non-volatile memory include ROM, PROM, EEPROM, flash memory, optical storage, magnetic storage, etc.

An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Methods described in the illustrative embodiments may be implemented as program modules or functional processes including routines, programs, objects, components, data structures, etc., that perform particular tasks or implement particular functionality, and may be implemented using existing hardware. Such existing hardware may include one or more processors (e.g. one or more central processing units), digital signal processors (DSPs), application-specific-integrated-circuits, field programmable gate arrays (FPGAs), computers, or the like.

Unless specifically stated otherwise, or as is apparent from the discussion, terms such as processing or computing or calculating or determining or the like, refer to the actions and processes of a computer system, or similar electronic computing device. Note also that software implemented aspects of the example embodiments may be encoded on some form of non-transitory program storage medium or implemented over some type of transmission medium. The program storage medium may be magnetic (e.g. a floppy disk or a hard drive) or optical (e.g. a compact disk read only memory, or CD ROM), and may be read only or random access. Similarly the transmission medium may be twisted wire pair, coaxial cable, optical fibre, or other suitable transmission medium known in the art. The example embodiments are not limited by these aspects in any given implementation.

Further implementations are summarized in the following examples:

Example 1

A method of encoding visual data using a plurality of layers wherein each layer encodes a different representation, and wherein one or more of the plurality of layers comprises one or more hierarchical algorithms, the method comprising the steps of:

extracting one or more samples within each of the plurality of layers; and processing within each layer the one or more samples extracted in the layer;

wherein in at least one of the plurality of layers the step of processing comprises applying the one or more hierarchical algorithms to the samples extracted in the layer in relation to any inter-layer prediction; and wherein the step of processing reduces a predetermined mathematical distortion between samples of a first layer and samples of a second layer.

Example 2

The method of example 1, wherein the plurality of layers comprises one or more enhancement layers and one or more base layers.

Example 3

The method of any previous example, wherein the step of applying the one or more hierarchical algorithms to the samples extracted in the layer in relation to any inter layer prediction occurs prior to or as part of any inter layer prediction.

Example 4

The method of any previous example, wherein the one or more samples are any of: blocks, macroblocks, prediction units, coding units, patches, segments, shapes, groups of pixels, slices, tiles, fields, frames, pictures, or single pixel values located at or between pixel positions.

Example 5

The method of any previous example, further comprising a step of processing in at least one of the plurality of layers; wherein the step of processing in at least one of the plurality of layers comprises applying the one or more hierarchical algorithms to one or more inter-layer predictions.

Example 6

The method of example 5, further comprising applying the one or more hierarchical algorithms to all inter-layer predictions.

Example 7

The method of any one of examples 5 or 6, where one of the one or more hierarchical algorithms generates a higher resolution version of the one or more samples for inter-layer prediction based on a block basis.

Example 8

The method of any one of examples 5, or 6, where one of the one or more hierarchical algorithms generates a higher resolution version of the one or more samples for inter-layer prediction based on a picture basis.

Example 9

The method of any one of examples 5, or 6, where one of the one or more hierarchical algorithms generates a higher resolution version of the one or more samples for inter-layer prediction based on a sub-picture basis.

Example 10

The method of any previous example, further comprising applying the one or more hierarchical algorithms to a plurality of different components.

Example 11

The method of example 10, wherein the different components may be any of: a residual component, a visual data component, luma components, chroma components, transformed data, filter coefficients, syntax component, prediction modes, supplemental enhancement information component, or a motion data component.

Example 12

The method of any one of examples 10 or 11, wherein one of the plurality of different components communicates with one or more of the plurality of different components to improve the process of the different components.

Example 13

The method of example 12, wherein the communication between the different components is unilateral.

Example 14

The method of example 12, wherein the communication between the different components is bilateral.

Example 15

The method of any previous example, wherein the processing occurs on one or more blocks of pictures in one or more of the plurality of layers.

Example 16

The method of any previous example, wherein the one or more hierarchical algorithms are different hierarchical algorithms.

Example 17

The method of any previous example, wherein the processing occurs only on any one of: I-pictures, IRAP pictures, or intra-encoded pictures.

Example 18

The method of example 17, wherein the processing results in a prediction for an enhancement layer.

Example 19

The method of any previous example, wherein the one or more samples are not fully reconstructed in one of the one or more base layers.

Example 20

The method of example 19, wherein a first hierarchical algorithm comprises one or more layers of one or more further hierarchical algorithms, and wherein one or more hierarchical algorithms comprises both the first hierarchical algorithm and the one or more further hierarchical algorithms.

Example 21

The method of example 9, wherein the sub-picture basis comprises: a group of blocks; slices; tiles; or fields.

Example 22

The method of example 15 or any example dependent thereon, further comprising applying a different hierarchical algorithm to each of the one or more blocks.

Example 23

The method of any previous example, further comprising applying a different hierarchical algorithm to each of the plurality of layers.

Example 24

The method of any one of examples 2 to 23, wherein the plurality of layers comprises a plurality of enhancement layers and the method further comprises applying a different hierarchical algorithm between different enhancement layers where the same base layer is used.

Example 25

The method of any one of examples 2 to 24, further comprising applying a different hierarchical algorithm to the one or more samples from a plurality of the one or more base layers resulting in a plurality of enhancement layer predictions.

Example 26

The method of any previous example, wherein the step of processing the one or more samples further comprises applying a plurality of the one or more hierarchical algorithms on the samples and storing the resulting pictures for inter-layer prediction.

Example 27

The method of any previous example, wherein the one or more samples are pictures from different layers and wherein an output of the hierarchical algorithm is one or more predicted enhancement layer pictures.

Example 28

The method of example 27, wherein the one or more samples are a low resolution high quality base layer and a low quality high resolution base layer.

Example 29

The method of any previous example, wherein the one or more hierarchical algorithms predicts a motion vector of one or more higher layers.

Example 30

The method of any one of examples 2 to 29, wherein the one or more hierarchical algorithms predict a delta motion vector compared to the one or more base layers.

Example 31

The method of any previous example, wherein the one or more hierarchical algorithms predict the partitioning of a group of pixels.

Example 32

The method of example 31, wherein the partitioning is macroblock partitioning.

Example 33

The method of example 31, wherein the partitioning is CU-splitting.

Example 34

The method of example 31, wherein the partition is superblock-subdivision.

Example 35

The method of any previous example, wherein the one or more hierarchical algorithms are applied to one or more output reference pictures, such as golden reference frames.

Example 36

The method of example 35, wherein the one or more golden reference frames are selected from one or more previously received frames and/or visual data.

Example 37

The method of any previous example, further comprising the step of applying one or more hierarchical algorithms within a spatial layer when the resolution of the layer is changed adaptively.

Example 38

The method of any previous example, further comprising the step of applying one or more hierarchical algorithms to one or more previously decoded and stored reference pictures.

Example 39

The method of example 38, wherein the distortion between the one or more previously decoded and stored reference pictures, and one or more current pictures is reduced.

Example 40

The method of example 39, further comprising predicting the current pictures using the one or more previously decoded and stored reference pictures from a one or more different layers.

Example 41

The method of any previous example, further comprising applying the one or more hierarchical algorithms to predict one or more higher layers, wherein the higher layers are not temporally co-located.

Example 42

The method of any one of examples 29 or 41, wherein the one or more higher layers improve the visual quality of the scene representation.

Example 43

The method of any previous example, further comprising applying the one or more hierarchical algorithms to one or more input samples from one or more temporal reference pictures from one of the plurality of layers and/or to one or more temporally co-located base layer pictures and/or one or more temporally non-collocated previously decoded base layer pictures.

Example 44

The method of example 43, further comprising applying the one or more hierarchical algorithms to the one or more input samples from temporally co-located or non-co-located input samples from one or more lower layers.

Example 45

The method of example 44, wherein the one or more lower layers represent a lower quality representation of the scene.

Example 46

The method of any one of examples 43 to 45, wherein one or more hierarchical algorithms have been applied to the input sample.

Example 47

The method of any one of examples 43 or 46, wherein an output is stored in a reference picture buffer.

Example 48

The method of any one of examples 43 to 47, wherein the same hierarchical algorithm is used throughout.

Example 49

The method of any one of examples 43 to 48, wherein the one or more hierarchical algorithms are applied in parallel.

Example 50

The method of any one of examples 2 to 49, further comprising applying the one or more hierarchical algorithms with one or more reconstructed pictures of the one or more base layers to generate a picture of the one or more enhancement layers.

Example 51

The method of example 50, wherein the reconstructed pictures are temporally co-located.

Example 52

The method of example 50, wherein the reconstructed pictures are not temporally co-located.

Example 53

The method of any one of examples 50 to 52, wherein one or more hierarchical algorithms have been applied to the reconstructed pictures.

Example 54

The method of any previous example, wherein one or more of the layers is a scalable layer.

Example 55

The method of example 54, wherein each scalable layer represents a viewpoint of a 3D scene.

Example 56

The method of example 55, wherein a resolution for a first viewpoint is different to a resolution for one or more further viewpoints.

Example 57

The method of example 56, wherein the one or more layers comprise a plurality of viewpoints in a frame packed arrangement and the one or more enhancement layers comprise additional data to improve the resolution of the one or more viewpoints of the frame packed arrangement.

Example 58

The method of any one of examples 55 to 57, wherein an inter-view prediction is applied between the different viewpoints of a 3D scene.

Example 59

The method of any of examples 55 to 58 when dependent on example 10, wherein the one or more hierarchical algorithms are applied to any of the plurality of different components of the one or more viewpoints to predict one or more components of the one or more further viewpoints.

Example 60

The method of any previous example, wherein the one or more hierarchical algorithms are applied as a view synthesis process.

Example 61

The method of example 60, wherein a result of the view synthesis process is used for inter-view prediction.

Example 62

The method of any of examples 60 or 61, wherein a result of the view synthesis process is used to create a multiview output.

Example 63

The method of any previous example, wherein an output of the one or more hierarchical algorithms is used for view synthesis.

Example 64

The method of any previous example, further comprising applying the one or more hierarchical algorithms on a decoded output for one or multiple layers or viewpoints for view synthesis, and determining one or more intermediate views for displaying.

Example 65

The method of any of examples 10 to 64, further comprising receiving multiple components.

Example 66

The method of any previous example, further comprising applying the one or more hierarchical algorithms to generate one or more lower-resolution representations.

Example 67

The method of any previous example, wherein the one or more hierarchical algorithms is any of: pre-trained, pre-defined, fine-tuned, self-updating, selected from a database of hierarchical algorithms, or trained using a learned approach.

Example 68

The method of example 67, wherein the learned approach comprises machine learning techniques.

Example 69

The method of any previous example, wherein the one or more hierarchical algorithms are received.

Example 70

The method of example 69, wherein the one or more hierarchical algorithms are stored in a memory.

Example 71

The method of any previous example, wherein the hierarchical algorithm is any of one or more: convolutional neural networks, recurrent neural networks, random forests, long-short term memory, memory networks, gated recurrent network, or a dictionary learning based method or methods.

Example 72

The method of any previous example, wherein the hierarchical algorithm comprises a plurality of layers.

Example 73

The method of example 72, wherein the layers are any of sequential, recurrent, recursive, branching or merging.

Example 74

The method of any previous example, wherein encoding comprises compression.

Example 75

The method of any previous example, wherein the visual data comprises at least one of: an image, a sequence of images, a video, or a section of image or video data.

Example 76

The method substantially as hereinbefore described in relation to FIGS. 1 to 15.

Example 77

Apparatus for carrying out the method of any previous example.

Example 78

A computer program product comprising software code for carrying out the method of any one of examples 1 to 76.

Example 79

Apparatus comprising:
at least one processor;
at least one memory including computer program code which, when executed by the at least one processor, causes the apparatus to perform the method of any one of examples 1 to 76.

Example 80

A computer readable medium having computer readable code stored thereon, the computer readable code, when executed by at least one processor, causing the performance of the method of any one of examples 1 to 76.

What is claimed is:

1. A method of encoding scalable visual data using a plurality of layers, the method comprising:
   extracting decoded pixel data from a base layer;
   applying a first convolutional neural network to the decoded pixel data of the base layer to obtain predicted pixel data, the predicted pixel data configured to be used for inter-layer prediction within an enhancement layer;
   extracting motion vector data from the base layer; and
   applying a second convolutional neural network to the motion vector data of the base layer to obtain predicted motion vector data, the predicted motion vector data configured to be used for motion estimation within the enhancement layer.
2. The method of claim 1, wherein the first convolutional neural network includes an upscaling process such that the predicted pixel data includes upscaled pixel data.

3. The method of claim 1, wherein the second convolutional neural network includes an upscaling process such that the predicted motion vector data includes upscaled motion vector data.

4. The method of claim 1, wherein the first convolutional neural network is connected between an input of a reference picture buffer in the base layer and an input of a reference picture buffer in the enhancement layer.

5. The method of claim 1, wherein the second convolutional neural network is connected between a motion estimation block in the base layer and a motion estimation block in the enhancement layer.

6. The method of claim 1, further comprising:
receiving, by the second convolutional neural network, one or more block modes as an input to the second convolutional neural network.

7. The method of claim 1, further comprising:
extracting intra prediction data from the base layer;
applying a third convolutional neural network to the intra prediction data of the base layer to obtain predicted pixel data for use by the enhancement layer for intra-layer prediction.

8. The method of claim 1, further comprising:
up-sampling the motion vector data from the base layer, wherein the second convolutional neural network is applied to the up-sampled motion vector data from the base layer.

9. An apparatus for encoding scalable visual data using a plurality of layers, the apparatus comprising:
at least one processor; and
at least one memory including computer program code which, when executed by the at least one processor, causes the apparatus to:
extract decoded pixel data from a base layer;
apply a first convolutional neural network to the decoded pixel data of the base layer to obtain predicted pixel data, the predicted pixel data configured to be used for inter-layer prediction within an enhancement layer;
extract motion vector data from the base layer; and
apply a second convolutional neural network to the motion vector data of the base layer to obtain predicted motion vector data, the predicted motion vector data configured to be used for motion estimation within the enhancement layer.

10. The apparatus of claim 9, wherein the first convolutional neural network includes an upscaling process such that the predicted pixel data includes upscaled pixel data.

11. The apparatus of claim 9, wherein the second convolutional neural network includes an upscaling process such that the predicted motion vector data includes upscaled motion vector data.

12. The apparatus of claim 9, wherein the first convolutional neural network is connected between an input of a reference picture buffer in the base layer and an input of a reference picture buffer in the enhancement layer.

13. The apparatus of claim 9, wherein the second convolutional neural network is connected between a motion estimation block in the base layer and a motion estimation block in the enhancement layer.

14. The apparatus of claim 9, wherein the second convolutional neural network is configured to receive one or more block modes as an input to the second convolutional neural network.

15. The apparatus of claim 9, further comprising:
extract intra prediction data from the base layer;
apply a third convolutional neural network to the intra prediction data of the base layer to obtain predicted pixel data for use by the enhancement layer for intra-layer prediction.

16. The apparatus of claim 9, further comprising:
up-sample the motion vector data from the base layer, wherein the second convolutional neural network is applied to the up-sampled motion vector data from the base layer.

17. A non-transitory computer-readable medium storing executable instructions that when executed by at least one processor are configured to cause the at least one processor to:
extract decoded pixel data from a base layer;
apply a first convolutional neural network to the decoded pixel data of the base layer to obtain predicted pixel data, the predicted pixel data configured to be used for inter-layer prediction within an enhancement layer;
extract motion vector data from the base layer; and
apply a second convolutional neural network to the motion vector data of the base layer to obtain predicted motion vector data, the predicted motion vector data configured to be used for motion estimation within the enhancement layer.

18. The non-transitory computer-readable medium of claim 17, wherein the first convolutional neural network includes an upscaling process such that the predicted pixel data includes upscaled pixel data.

19. The non-transitory computer-readable medium of claim 17, wherein the second convolutional neural network includes an upscaling process such that the predicted motion vector data includes upscaled motion vector data.

20. The non-transitory computer-readable medium of claim 17, wherein the first convolutional neural network is connected between an input of a reference picture buffer in the base layer and an input of a reference picture buffer in the enhancement layer.

* * * * *